(12) United States Patent
Du et al.

(10) Patent No.: US 8,623,928 B2
(45) Date of Patent: Jan. 7, 2014

(54) POLYMERS OF INTRINSIC MICROPOROSITY CONTAINING TETRAZOLE GROUPS

(75) Inventors: Naiying Du, Ottawa (CA); Michael D. Guiver, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 74 days.

(21) Appl. No.: 13/509,630

(22) PCT Filed: Oct. 28, 2010

(86) PCT No.: PCT/CA2010/001722
§ 371 (c)(1),
(2), (4) Date: May 14, 2012

(87) PCT Pub. No.: WO2011/057384
PCT Pub. Date: May 19, 2011

(65) Prior Publication Data
US 2012/0264589 A1    Oct. 18, 2012

Related U.S. Application Data

(60) Provisional application No. 61/272,861, filed on Nov. 12, 2009.

(51) Int. Cl.
*B01J 41/14* (2006.01)
*C07D 257/00* (2006.01)
(52) U.S. Cl.
USPC ............................................. 521/32; 548/250
(58) Field of Classification Search
USPC ............................................. 521/32; 548/250
See application file for complete search history.

(56) References Cited

U.S. PATENT DOCUMENTS

| 5,284,954 | A | 2/1994 | Wittenberget et al. |
| 5,445,669 | A | 8/1995 | Nakabayashi et al. |
| 5,599,943 | A | 2/1997 | Kato et al. |
| 5,744,612 | A | 4/1998 | Koguro et al. |
| 6,277,998 | B1 | 8/2001 | Ushio et al. |

(Continued)

FOREIGN PATENT DOCUMENTS

| CA | 2615492 | 1/2007 |
| JP | 8071386 | 3/1996 |

(Continued)

OTHER PUBLICATIONS

Du. N. et al "High-Performance Carboxylated Polymers of Intrinsic Microporosity (PIMs) with Tunable Gas Transport Properties", Macromolecules 2009, 42, 6038-6043, published on web Jun. 24, 2009.*

(Continued)

*Primary Examiner* — Michael Bernshteyn
(74) *Attorney, Agent, or Firm* — Catherine Eckenswiller

(57) ABSTRACT

The invention provides a tetrazole-containing polymer of intrinsic microporosity comprising (10) or more subunits, wherein one or more of the subunits comprise one or more tetrazolyl moieties. In one embodiment, a polymer of intrinsic microporosity (PIM-1) was modified using a "click chemistry" [2+3] cycloaddition reaction with sodium azide and zinc chloride to yield new PIMs containing tetrazole units. Polymers of the present invention are useful as high-performance materials for membrane-based gas separation, materials for ion exchange resins, materials for chelating resins, materials for superabsorbents, materials for ion conductive matrixes, materials for catalyst supports or materials for nanoparticle stabilizers.

18 Claims, 11 Drawing Sheets

(56) References Cited

U.S. PATENT DOCUMENTS

| | | |
|---|---|---|
| 6,635,103 B2 | 10/2003 | Sirkar et al. |
| 7,011,694 B1 | 3/2006 | Ho |
| 7,435,496 B2 | 10/2008 | Li et al. |
| 2003/0204041 A1 | 10/2003 | Laas et al. |
| 2005/0272873 A1 | 12/2005 | Miller et al. |
| 2007/0040167 A1 | 2/2007 | Miller et al. |
| 2008/0099111 A1 | 5/2008 | Miller et al. |
| 2008/0173179 A1 | 7/2008 | Tandan et al. |
| 2009/0149565 A1 | 6/2009 | Liu et al. |

FOREIGN PATENT DOCUMENTS

| | | |
|---|---|---|
| JP | 9173801 | 7/1997 |
| JP | 10180062 | 7/1998 |
| JP | 2002239357 | 8/2002 |
| JP | 2008036463 | 2/2008 |
| JP | 2008068238 | 3/2008 |
| RU | 2146169 | 3/2000 |
| RU | 2354443 | 5/2009 |
| WO | 03/000774 | 1/2003 |
| WO | 2005/012397 | 2/2005 |
| WO | 2005/051929 | 6/2005 |
| WO | 2006/076465 | 7/2006 |
| WO | 2007/054965 | 5/2007 |
| WO | 2009/044588 | 4/2009 |
| WO | 2009/059360 | 5/2009 |
| WO | 2009/093666 | 7/2009 |

OTHER PUBLICATIONS

Du. N. et al "Polymers of Intrinsic Microporosity Derived from Novel Disulfone-Based Monomers", Macromolecules, 2009, 42, 6023-6030, published on web Jul. 1, 2009.*
Aronson JB. (2004) Thesis: The Synthesis and Characterization of Energetic Materials from Sodium Azide. {Georgia Institute of Technology).
Bara JE, Lessmann S, Gabriel CJ, Hatakeyama ES, Noble RD, Gin DG. (2007) Ind. Eng. Chem. Res. 46, 5397-5404.
Bara JE et al. (2007) Improving CO2 selectivity in polymerized room-temperature ionic liquid gas separation membranes through incorporation of polar substituents. Journal of Membrane Science 321 (2008) 3-7.
Bates ED, Mayton RD, Ntai L, Davies JH. (2002) J. Am. Chem. Soc. 124, 926-927.
Binder WH, Sachsenhofer R. (2007) Macromol. Rapid Commun. 28, 15-54.
Blanchard LA, Hancu D, Beckman EJ, Brennecke JF. (1999) Nature. 399, 28-29.
Budd PM, Ghanem BS, Makhseed S, McKeown NB, Msayeb KJ, Tattershall CE. (2004a) Chem. Commun. 230-231.
Budd PM, Elabas ES, Ghanem BS, Makhseed S, McKeown NB, Msayeb K J, Tattershall CE, Wong D. (2004b) Adv. Mater. 16, 456-459.
Budd PM, McKeown NB, Fritsch D. (2005a) J. Mater. Chem. 15, 1977-1986.
Budd PM, Msayib KJ, Tattershall CE, Reynolds KJ, McKeown NB, Fritsch D. (2005b) J. Membr. Sci. 251, 263-269.
Budd PM, McKeown NB, Ghanem BS, Msayib KJ, Fritsch D, Starannikova L, Belov N, Sanfirova O, Yampolskii Y, Shantarovich V. (2008) J. Membr. Sci. 325, 851-860.
Dabbagh Ha et al (2007) Synthesis, Characterization, and Free Radical Polymerization of New Acrylamide-Based Monomer Containing a 1H-Tetrazole Ring: Thermal Investigation and Derivatization of the Homopolymer. Russian Journal of Organic Chemistry, 2007, vol. 43, No. 6, pp. 888-896.
Darkow R et al (1994) Photomodification of a Poly ( acrylonitrile-co-butadiene-costyrene) Containing Diaryltetrazolyl Groups. Journal of Polymer Science: Part A Polymer Chemistry, vol. 32, 1657-1664.
Darkow R, Hartmann U, Tomaschewski G. (1997) React. Funct. Polym. 32, 195-207.

Demko ZP, Sharpless KB. (2001) J. Org. Chem. 66, 7945-7950.
Demko ZP, Sharpless KB. (2002a) Angew. Chem., Int. Ed. 41, 2110-2113.
Demko ZP, Sharpless KB. (2002b) Angew. Chem., Int. Ed. 41, 2113-2116.
Disli A, Salman M. (2009) Russian Journal of Organic Chemistry. 45, 151-153.
Du N, Robertson GP, Song J, Pinnau I, Thomas S, Guiver MD. (2008a) Macromolecules. 41, 9656-9662.
Du N, Song J, Robertson GP, Pinnau I, Guiver MD. (2008b) Macromolecular Rapid Communications. 29, 783-788.
Du N, Robertson GP, Pinnau I, Guiver MD. (2009a) Macromolecules. 42, 6023-6030.
Du N, Robertson GP, Pinnau I, Thomas S, Guiver MD. (2009b) Macromol. Rapid Commun. 30, 584-588.
Du N, Robertson GP, Song J, Pinnau I, Guiver MD. (2009c) Macromolecules. 42, 6038-6043.
Du N. et al (2010) Macromolecules, 43, 8580-8587.
Earle MJ, Seddon KR. (2002) ACS Symp. Ser. 819, 10-25.
Ferguson L, Scovazzo P. (2007) Ind. Eng. Chem. Res. 46, 1369.
Gan Q, Rooney D, Xue ML, Thompson G, Zou Y. (2006) J. Membr. Sci. 280, 948-956.
Gaponik PN (1994) Die Angewandte Makromolekuiare Chemie 219, 77-88 (Nr. 3823).
Gaponik PN (1994b) Die Angewandte Makromolekulare Chemie 219, 89-99 (Nr. 3824).
Gromadzki D (2008) European Polymer Journal 44, 189-199.
Himo F, Demko ZP, Noodleman L, Sharpless KB. (2003) J. Am. Chem. Soc. 125, 9983-9987.
Hu X, Tang JB, Balsig A, Shen YQ, Radosz M. (2006) J. Membr.Sci. 281, 130-138.
Huang MR (2004) Reactive & Functional Polymers 59, 53-61.
Huisgen R, Szeimies G, Möbius L. (1967) Chem. Ber. 100, 2494-2507.
Jin T, Kitahara F, Kamijo S, Yamamoto Y. (2008) Chemistry—An Asian Journal. 3, 1575-1580.
Kizhnyaev VN (2008) Polymer Science, Ser. C, vol. 50, No. 1, pp. 1-21.
Kolb HC, Finn MG, Sharpless KB. (2001) Angew. Chem. Int. Ed. 40, 2004-2021.
Lesnikovich AI (1993) Thermochimica Acta, 215, 303-313.
Levchik SV (1990) Thermochtmica Acta, 168, 211-221.
Levchik SV (1995) Polymer Degradation and Stability 47 (1995) 333-338.
McKeown NB, Budd PM, Msayeb KJ, Ghanem BS, Kingston HJ, Tattershall CE, Makhseed S, Reynolds KJ, Fritsch D. (2005a) Chem. Eur. J. 11, 2610-2620.
Morgan D, Ferguson L, Scovazzo P. (2005) Ind. Eng. Chem. Res. 44, 4815.
Nedelko VV (1991) Thermochimica Acta, 179, 209-220.
Plechkova NV, Seddon KR. (2008) Chem. Soc. Rev. 37, 123-150.
Prokudin VG, Poplaysky VS, Ostrovskii. (1996) Russ. Chem. Bull. 45, 2094-2100.
Pu H et al (2006) Reactive & Functional Polymers 66, 856-862.
Pu H et al (2008) Journal of Membrane Science 322, 392-399.
Robeson LM. (1991) J. Membr. Sci. 62, 165.
Robeson LM. (2008) J. Membr. Sci. 320, 390-400.
Scovazzo P, Kieft J, Finan DA, Koval C, DuBois D, Noble R. (2004) J. Membr. Sci. 238, 57.
Shie J, Fang JJ. (2007) Org. Chem. 72, 3141-3144.
Silverstein RM, Webster FX. (2005) Spectrometric Identification of Organic Compounds. John Wiley & Sons, Inc. 6th ed.; p. 163-166.
Staiger CL, Pas SJ, Hill AJ, Cornelius C. (2008) J. Chem. Mater. 20, 2606-2608.
Stille JK, et al (1969) Journal of Polymer Science: Part A-1 vol. 7, 2493-2504.
Taden A et al (2002) Journal of Polymer Science: Part A: Polymer Chemistry, vol. 40, 4333-4343.
Tang JB, Sun WL, Tang HD, Radosz M, Shen YQ. (2005a) Macromolecules. 38, 2037-2039.
Tang HD, Tang JB, Ding SJ, Radosz M, Shen YQ. (2005b) J. Polym. Sci. 43 1432-1443.

(56) References Cited

OTHER PUBLICATIONS

Tang JB, Tang HD, Sun WL, Plancher H, Radosz M, Shen YQ. (2005c) Chem. Comm. 3325-3327.

Tsarevsky NV, Bernaerts KV, Dufour B, Du Prez FE, Matyjaszewski K. (2004) Macromolecules. 37, 9308-9313.

Vygodskii YaS, Mel'nik OA, Kazakova EV, Shaplov AS, Komarova LI, Kizhnyaev VN. (2008) Polymer Science, Ser. B. 50 193-197.

Wasserscheid P, Keim W. (2000) Angew Chem Int Ed. 39, 3772-3789.

International Search Report and Written Opinion dated Feb. 9, 2011 on PCT/CA2010/001722.

* cited by examiner

POLYMERS OF INTRINSIC MICROPOROSITY CONTAINING TETRAZOLE GROUPS

CROSS-REFERENCE TO RELATED APPLICATIONS

This application is a national phase entry of International Patent Application Ser. No. PCT/CA2010/001722 filed Oct. 28, 2010 and claims the benefit of U. S. Provisional patent application Ser. No. 61/272,861 filed Nov. 12, 2009, the entire contents of both of which are herein incorporated by reference.

FIELD OF THE INVENTION

The present invention is related to polymers of intrinsic microporosity (PIMs) containing tetrazole groups, to processes for producing such polymers and to uses of such polymers, particularly in gas separation membranes.

BACKGROUND OF THE INVENTION

In recent decades, polymeric microporous materials have been a topic of considerable interest for industrial and academic researchers because of their promising application in gas separation membrane, sorption resins, chromatographic materials and hydrogen storage media. Among polymeric microporous materials, a new class of ladder-type polydibenzodioxanes having sites of contortion, referred to as polymers of intrinsic microporosity (PIMs) by the inventors Budd et al. and McKeown et al. (Budd 2004a; Budd 2004b; Budd 2005a; Budd 2005b; McKeown 2005a) are recently attracting much attention. The rigid special structure of the main chain provides significant advantages, such as good processibility, a broader range of physical properties, potential for introducing functionality and high permeability combined with a moderate selectivity for membrane gas separation.

PIM-type materials are characterized by having repeat units of dibenzodioxane-based ladder-type structures combined with sites of contortion, which may be those having spiro-centers or severe steric hindrance. The chain structures of PIMs prevent dense chain packing, causing considerably large accessible surface areas and high gas permeability. Because of their distinctive structures, only a few tetraphenol monomers and tetrahalogenated monomers have been suitable for polymerization to provide high molecular weight PIM homopolymers and copolymers (McKeown 2005b; Du 2009a; Du 2008a; Du 2009b). It is desirable to expand the structural variety of PIM-type materials that contain the inherently stiff dibenzodioxane ladder structure and contorted center. In previous work, two approaches were pursued to access structurally new PIM materials: (1) the design of tetrafluoro monomers containing sulfone electron-withdrawing groups; and (2) post-polymerization modification of the PIM nitrile group by controlled hydrolysis.

PIM-1 is the most well-known and reported PIM-type materials for perhaps several reasons: (1) it has among the simplest structures; (2) it is made from commercially available monomers; (3) it is obtained in high molecular weight; and (4) it has reasonably good mechanical properties. As shown in Scheme 1, the PIM-1 repeat unit contains two nitrile groups, which is an appropriate substrate for testing the present approach for post-modification.

Scheme 1- Structure of PIM-1

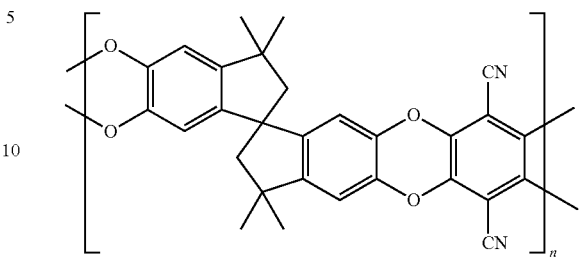

In previous work, a practical and controlled hydrolysis reaction of the nitrile groups in PIM-1 was reported, which resulted in structurally new PIM materials containing carboxylic groups. The gas permeation properties of the carboxylated PIMs were reported and discussed with respect to the degree of hydrolysis (Du 2009c).

Besides the nitrile hydrolysis reaction, the [2+3] cycloaddition reaction between a nitrile and azide is a route to tetrazoles. This type of reaction has also been referred to as "click chemistry" when accomplished in the presence of specific catalysts, on account of its rapid and high yield, and is a representative of a group of 1,3-polar cycloadditions, (a variation of the Huisgen 1,3-dipolar cycloaddition reaction between terminal acetylenes and azides) (Kolb 2001; Huisgen 1967). It has been successfully carried out by heating (80-120° C.) a mixture of the neat starting compounds (Demko 2002a; Demko 2002b) or in solvents such as DMSO or DMF and even in aqueous media (Demko 2001). The reaction is catalyzed by protic acids such as ammonium salts and acetic acid or Lewis acids, such as $SnCl_2$ or $ZnCl_2$. The mechanism of the Zn(II)- and Al(III)-catalyzed reaction was recently studied theoretically and most likely involves coordination of the metal ion to a nitrile molecule (Himo 2003). Similar to the $ZnCl_2$ catalyzed Click reactions between azide and nitrile groups to yield low molecular weight tetrazole compounds (Binder 2007), post-polymerization modification reactions for attaching tetrazoles onto nitrile-containing polymers has become somewhat of a re-discovery (Tsarevsky 2004) with several apparent advantages which include (1) quantitative yields, (2) a high tolerance for the presence of other functional groups, (3) an insensitivity of the reaction to solvents, irrespective of their protic/aprotic or polar/non-polar character, and (4) reactions at various types of interfaces, such as solid/liquid, liquid/liquid, or even solid/solid interfaces. Until now, relatively little work on the post-polymerization [2+3] cycloaddition modification of nitrile-containing polymers has been reported.

Further, during the last decade, ionic liquids, which are organic salts with a melting point lower than 100° C. (Earle 2002), have attracted considerable interest because of their excellent chemical stability, non-flammability, and negligible volatility (Wasserscheid 2000). In the last five year, ionic liquids have been explored as ideal media candidates called promising "green materials" to replace volatile organic compounds (VOCs) in gas scrubbing, separations, and storage/delivery applications. Especially, these materials have great utility in applications involving $CO_2$ separations, due to the high solubility of $CO_2$ in ionic liquids (Blanchard 1999; Tang 2005a; Plechkova 2008). Permeabilities, solubilities, and diffusivities of $CO_2$ in ionic liquids are usually measured by using a supported ionic liquid membrane (SILM) which have already shown very promising performance for $CO_2$ (Scovazzo 2004; Morgan 2005; Gan 2006; Ferguson 2007). However, one of the major drawbacks associated with SILMs is that the ionic liquid is held in the pores of the support via relatively weak capillary forces. If the transmembrane pressure differential exceeds those forces, the ionic liquid will be pushed through the support, destroying the membranes' selectivity (Bara 2007). Thus, SILMs are usually only tested at pressure differentials of about 0.2 atm. Nanoporous supports have been used to successfully overcome these limitations, and SILMs made using these supports have been reported to be stable at pressures up to 7 atm (Gan 2006).

Polymeric forms of ionic liquids is another approach providing exceptional properties, such as chemical stability and excellent $CO_2$ capture properties (Tang 2005b; Bara 2007). Tang and his coworkers found that solid polymerized ionic liquids absorb $CO_2$ with a higher absorption capacity and at a much faster absorption rate than room temperature ionic liquids (Tang 2005a; Tang 2005c). But, the permeabilities of all these materials reported as polymerized ionic liquids are very low due to the nature of the polymer main chain. In addition, most of the previously reported pure polymerized ionic liquids were too brittle to make mechanically stable membranes (Hu 2006).

In general, PIM-type materials are characterized as having very high gas permeability and moderate gas-pair selectivity. However, there still remains a need for devising new PIM-type materials having improved selectivity or other properties.

SUMMARY OF THE INVENTION

In one aspect of the invention, there is provided a tetrazole-containing polymer of intrinsic microporosity comprising 10 or more subunits, wherein one or more of the subunits comprise one or more tetrazolyl moieties.

The polymer preferably comprises from 10 to 10,000 subunits, more preferably from 40 to 1500 subunits, yet more preferably from 40 to 1000 subunits. The polymer may be a homopolymer where each subunit is the same or a heteropolymer where at least one subunit is different from the others. Further, heteropolymers may comprise subunits having a core structure based on the same monomer in which the differences between subunits arise only from the number of tetrazolyl moieties on each subunit, or the heteropolymers may comprise subunits having core structures based on two or more different monomers.

The number of tetrazolyl moieties in the polymer may be defined by a degree of tetrazole substitution. In any polymer there are a limited number of sites available for tetrazole substitution, thus there is a maximum number of tetrazolyl moieties that may be introduced onto the polymer. Therefore, the degree of tetrazole substitution may be defined as a number between 0 and 1 where a degree of tetrazole substitution of 0 means there are no tetrazolyl moieties on the polymer and a degree of tetrazole substitution of 1 means that the polymer contains the maximum number of tetrazolyl moieties that is possible for that polymer. In the present invention, the degree of tetrazole substitution is greater than 0, preferably in a range of from about 0.01 to 1, more preferably in a range of from about 0.1 to 1.

The polymer preferably has a general structure encompassed by Formula I:

where x is an integer of 10 or greater and A represents a subunit in the polymer, wherein one or more of the subunits comprises one or more tetrazolyl moieties, and wherein A for each subunit is independently

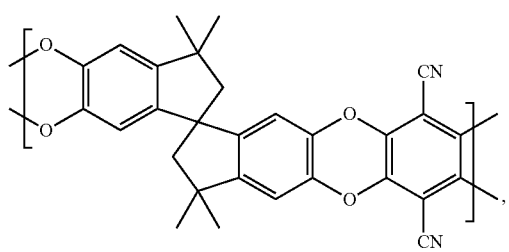

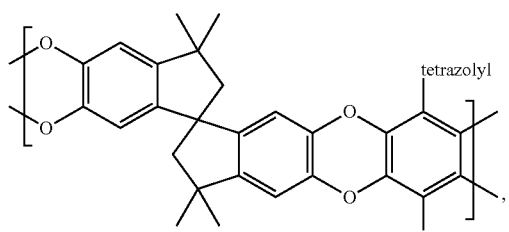

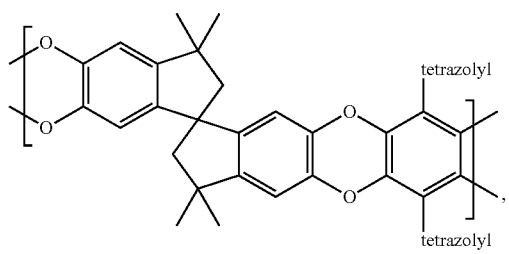

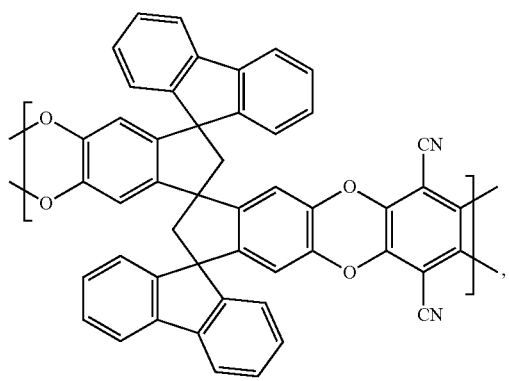

-continued
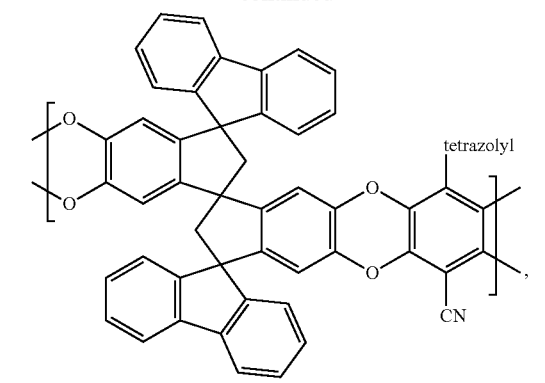
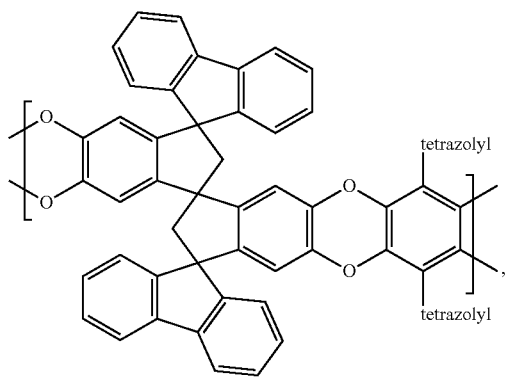
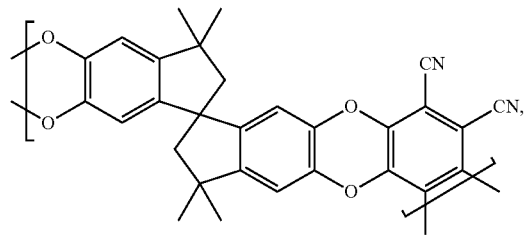
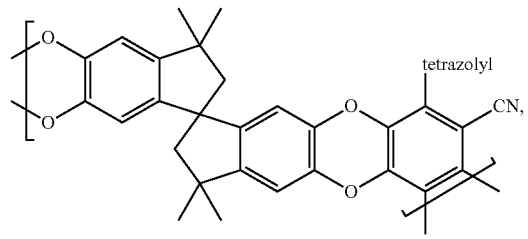
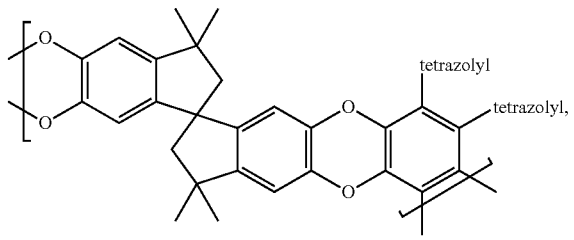
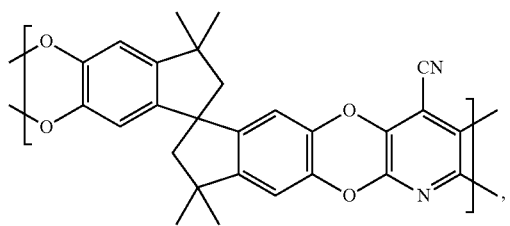
-continued
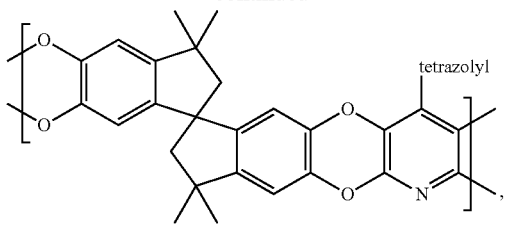
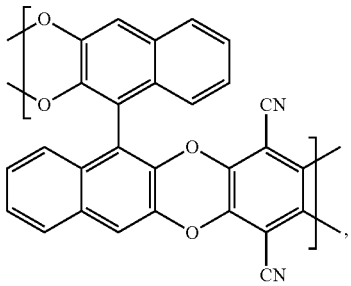
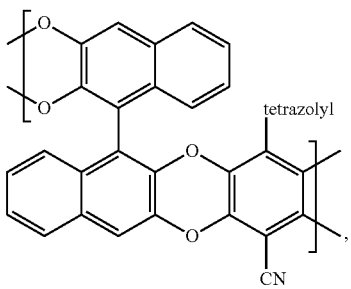
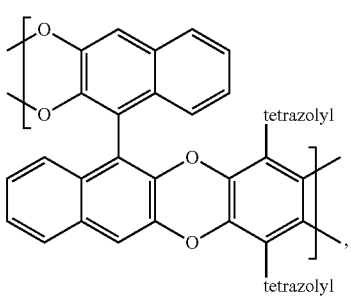
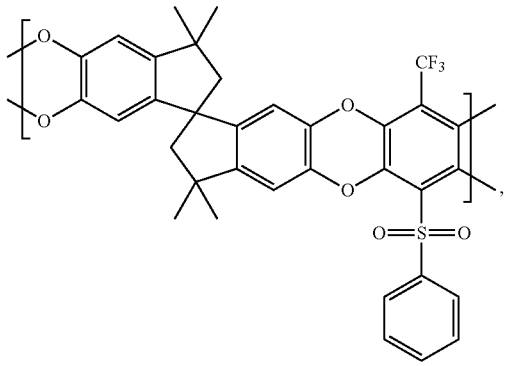

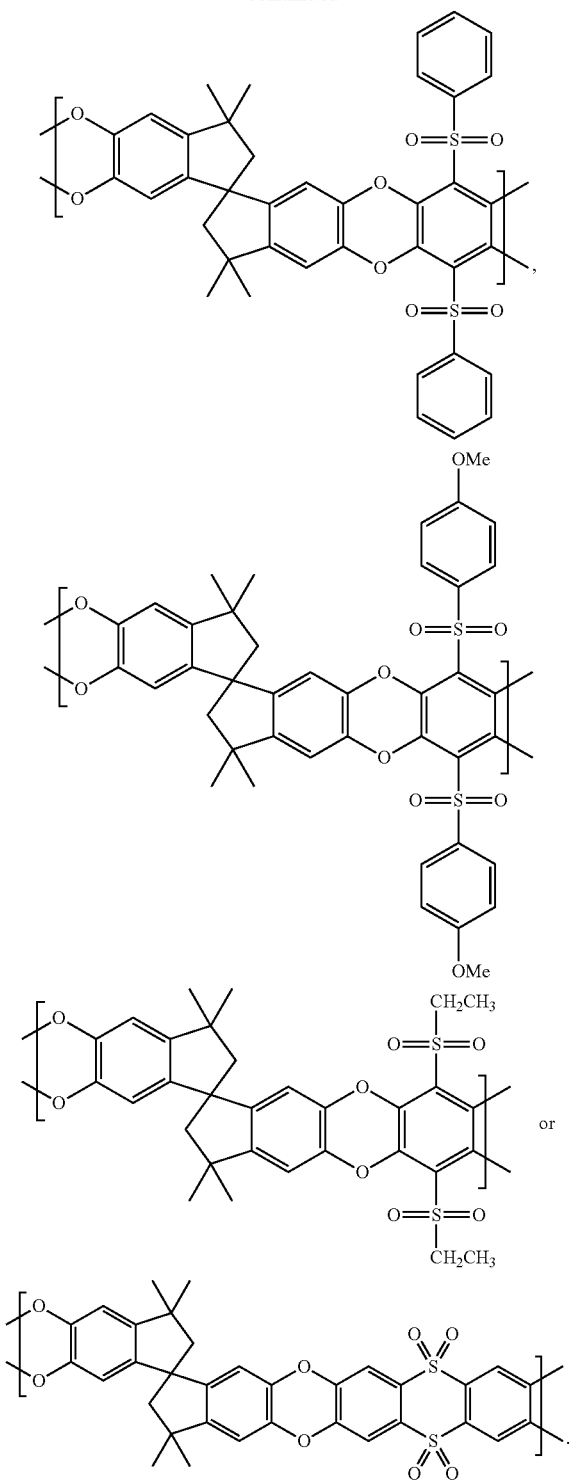

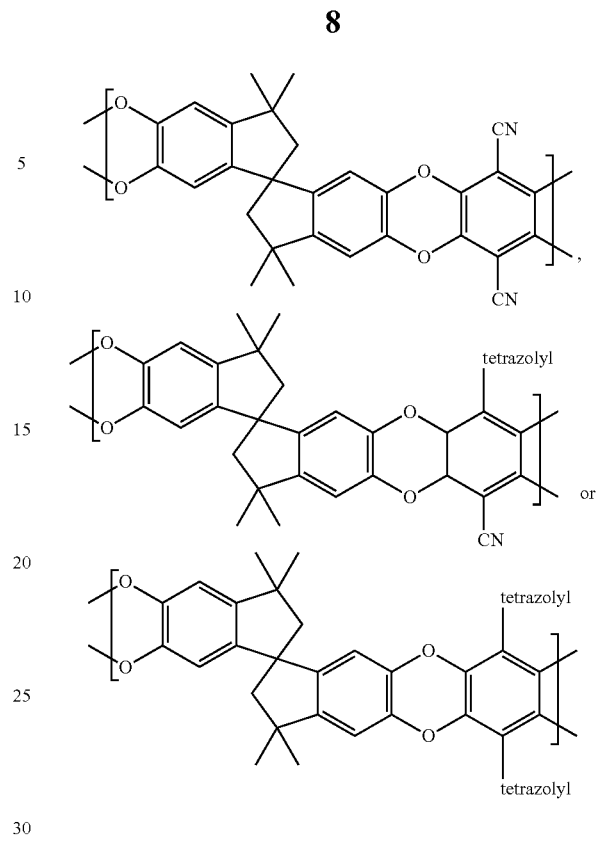

Preferably, x is an integer in a range from 10 to 10,000, more preferably from 40 to 1500, yet more preferably from 40 to 1000. Some of the subunits A in the polymer may not comprise a tetrazolyl moiety, however, in the polymer of Formula (I) one or more of the subunits comprises one or more tetrazolyl moieties, therefore, there must be at least one tetrazolyl moiety in the polymer. Preferably, each subunit A is independently provided that one or more of the subunits comprises one or more tetrazolyl moieties.

The tetrazolyl moieties on the polymer are, independently, unsubstituted or substituted. An unsubstituted tetrazolyl moiety has a hydrogen atom in the 2-position, which also exists in equilibrium with a tautomer in which the hydrogen atom is in the 3-position. A substituted tetrazolyl moiety preferably has an organic group in the 2-position. Each tetrazole moiety on the polymer may be the same or different; preferably they are the same. Preferably, the tetrazolyl moieties have a structure encompassed by general Formula (II) or a tautomer thereof:

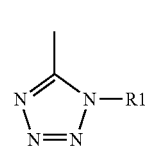

(II)

where R1 is H, alkyl (e.g. $C_1$-$C_6$-alkyl), aralkyl (e.g. $C_7$-$C_{13}$-aralkyl), arylsulfonyl (e.g. $C_7$-$C_{13}$-arylsulfonyl), alkylsulfonyl (e.g. $C_1$-$C_6$-alkylsulfonyl) or an ionic liquid group (e.g. $C_1$-$C_{20}$-organic amine).

Ionic liquid groups are preferably organic amine groups in which a tetra-coordinate amine nitrogen atom is bonded to a nitrogen atom of the tetrazolyl moiety so that the tetrazolyl moiety formally carries a negative charge and the amine group formally carries a positive charge.

The R1 group may have further substituents. Further substituents on the R1 group may be, for example, one or more of halo (e.g. F, Cl, Br), a metal ion (e.g. $Li^+$, $Na^+$, $K^+$, $Mg^{2+}$, $Ca^{2+}$), hydroxyl, $C_1$-$C_8$-alkoxy, amino, $C_1$-$C_6$-alkylamino, $C_6$-$C_{10}$-arylamino, amido, $C_1$-$C_6$-alkylamido, $C_6$-$C_{10}$-arylamido, $C_1$-$C_{10}$-carbonyl, $C_1$-$C_{10}$-carboxyl or $C_1$-$C_{10}$-estero.

Preferably R1 is H, $C_1$-$C_6$ alkyl, $C_7$-$C_{13}$ aralkyl, benzenesulfonyl substituted by $C_1$-$C_6$-alkylamido or $C_1$-$C_{10}$-organic amine. More preferably, R1 is H, benzyl, 4-acetamidobenezenesulfonyl, methylamine, diisopropylamine or N,N-diisopropylethylamine.

Tetrazole-containing polymers of the present invention may be synthesized by post-polymerization reaction on PIMs to introduce tetrazolyl moieties on to the PIM. The PIM materials produced may be homopolymers containing aromatic nitriles, or copolymers, or terpolymers, whereby at least one of the types of repeat units contains one or more aromatic nitrile groups. The conversion of aromatic nitrile to aromatic tetrazole may be partial or complete, depending on reaction conditions and time, as well as reactivity. The polymeric aromatic nitrile groups may react with either an inorganic azide salt, so as to form an aromatic tetrazole group, or it may react with an organic azide, so as to form an organically-substituted aromatic tetrazole. Preferred PIM homo- and copolymers containing nitrile groups that serve as substrates for [2+3] cycloaddition reactions with azides are show in FIG. 1. Preferably, a PIM comprising nitrile groups is subjected to a [2+3] cycloaddition click reaction by contacting the PIM with an azide in the presence of a metal halide. The azide may be an inorganic or organic azide. The use of inorganic azides, for example sodium azide ($NaN_3$) or potassium azide ($KN_3$), or trimethylsilyl azide ($TMS-N_3$) generally results in PIMs containing unsubstituted tetrazolyl moieties. To obtain PIMs comprising substituted tetrazolyl moieties, azides of the organic R1 groups described above may be used. Metal halides useful in the reaction include, for example, zinc chloride ($ZnCl_2$) and copper (I) bromide (CuBr). $ZnCl_2$ is typically used with inorganic azides, while CuBr with organic azides.

The reaction may be performed in solution or on PIM films directly. When performed in solution, a solvent in which the PIM is soluble is generally used. The particular solvent that is used depends on the solubility of the particular PIM. Some example of suitable solvents include N-methylpyrrolidone (NMP), water, tetrahydrofuran (THF), dichloromethane ($CH_2Cl_2$), chloroform ($CHCl_3$), dimethylacetamide (DMAc), dimethylformamide (DMF) or any mixture thereof. The reaction is conducted at any suitable temperature, preferably at an elevated temperature, more preferably at a temperature in a range of from about 40° C. to about 250° C., even more preferably from about 50° C. to about 205° C., for example from about 80° C. to about 180° C. The reaction may be sustained for any suitable period of time, for example from about 30 minutes to about 10 days, the optimal time being dependent on other factors like the type of PIM, the reaction temperature and the azide used. The amount of metal halide used is dependent on the amount of azide used, and is generally used in an amount to provide a 1 mol equivalent of halide to azide. The amount of azide used is adjustable to control the extent of conversion of nitrile to tetrazole on the PIM. For full conversion (i.e. to achieve a degree of tetrazole substitution equal to 1), it is desirable to use a molar excess of azide, up to a 20-fold excess being generally suitable. Finally, energy input for effecting the reaction may be accomplished by any suitable means, for example, thermal heating, microwave heating or ultrasonic irradiation.

Alternatively, PIMs with substituted tetrazole moieties may be obtained by derivatizing PIMs containing unsubstituted tetrazolyl moieties. Any number of N-substituted tetrazoles may be formed by generally known methods in which the tetrazole N—H is reacted with suitable reactants to replace the hydrogen atom with the desired R1 group. Particularly, amines have been proven useful in certain "task specific" ionic liquids for $CO_2$ capture (Bates 2002). Thus, in one embodiment of the present invention, poly(ionic liquid)s with intrinsically microporous structures (PILIMs) may be synthesized by reacting tetrazole-containing PIMs with different amines. Although tetrazole derivatives have been used in many areas, tetrazole-based ionic liquid, such as negatively charged tetrazole with amine, have been largely neglected; only a few groups reported the use of these materials as solvents, catalysts, or energetic materials (Laas 2003; Aronson 2004).

Advantageously, polymers of the present invention lead to one or more of the following desirable results: (1) extending the possible structures of PIMs; (2) differing solubility characteristics from existing PIMs (e.g. some tetrazole PIM is soluble in NMP, making it easier to fabricate or cast separation membranes, while PIM-1 is insoluble in NMP, but soluble in chloroform or THF); (3) increasing gas pair selectivity coupled with permeability that combines to exceed the Robeson upper bound; (4) providing capability to introduce further functionality through utilizing substituted organic azides; (5) providing intrinsic microporosity and large surface area; (6) improving the range of physical properties, which are relevant to their gas permeability and gas pair selectivity properties; (7) providing tunable properties (e.g. gas transport) through the degree of tetrazole substitution (e.g. degree of nitrile conversion to tetrazole); and, (8) providing good processing ability.

Further, the process for introducing tetrazole groups onto polymers by post polymerization modification has several advantages which include: (1) high conversion yields; (2) a high tolerance of functional groups; (3) an insensitivity of the reaction to solvents, irrespective of their protic/aprotic or polar/non-polar character; and, (4) reactions at various types of interfaces, such as solid/liquid, liquid/liquid, or even solid/solid interfaces.

Thus, in one embodiment, the present invention involves [2+3] cycloaddition modification of a polymer containing an aromatic nitrile group with an azide compound, leading to a tetrazole. The present invention extends the PIM spectrum beyond those reported previously and also demonstrates that significant improvements in gas separation properties may be obtained through post-modification of PIM materials containing nitrile groups. In a preferred embodiment, PIM-1 is converted to a series of ladder polymers having the same main-chain and containing various amounts of pendant tetrazole groups (TZ-PIM).

Polymers of the present invention are useful as high-performance materials for membrane-based gas separation, materials for ion exchange resins, materials for chelating resins, materials for superabsorbents, materials for ion conductive matrixes, materials for catalyst supports or materials for nanoparticle stabilizers.

Polymers of the present invention may be formulated into films by generally known methods. Films of the present invention are useful as materials for gas separation, vapor separation, adsorbents and catalysis. Applications include, for example, oxygen enrichment (oxygen-nitrogen separation), natural gas treatment (carbon dioxide-methane separation) and carbon dioxide capture from emissions (carbon dioxide-nitrogen separation). The films may be conveniently cast in any suitable form, for example free-standing membranes, dense films or coated films or membranes on support materials (e.g. thin film composite membranes).

Films of the present invention preferably have gas pair selectivities 1.1 times or more greater, more preferably 1.25 times or greater, than the corresponding gas pair selectivity of films cast from PIM-1. Increases in gas selectivity can be up to or even higher than 2 times greater than PIM-1. The extent of increase in gas selectivity depends on the gas pair. Particularly noteworthy gas pairs are $O_2/N_2$ and $CO_2/N_2$.

Films of tetrazole-containing polymers of intrinsic microporosity disclosed herein are high-performance materials for membrane-based gas separation. Since individual membrane gas separation applications often require certain gas selectivity ranges to be viable, the present films offer an unexpected way to tune the selectivity of the gases to an optimal required range. By adjusting the degree of tetrazole substituion of the polymers in the present films, it is now possible to conveniently provide membranes for a large variety of gas separation applications.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
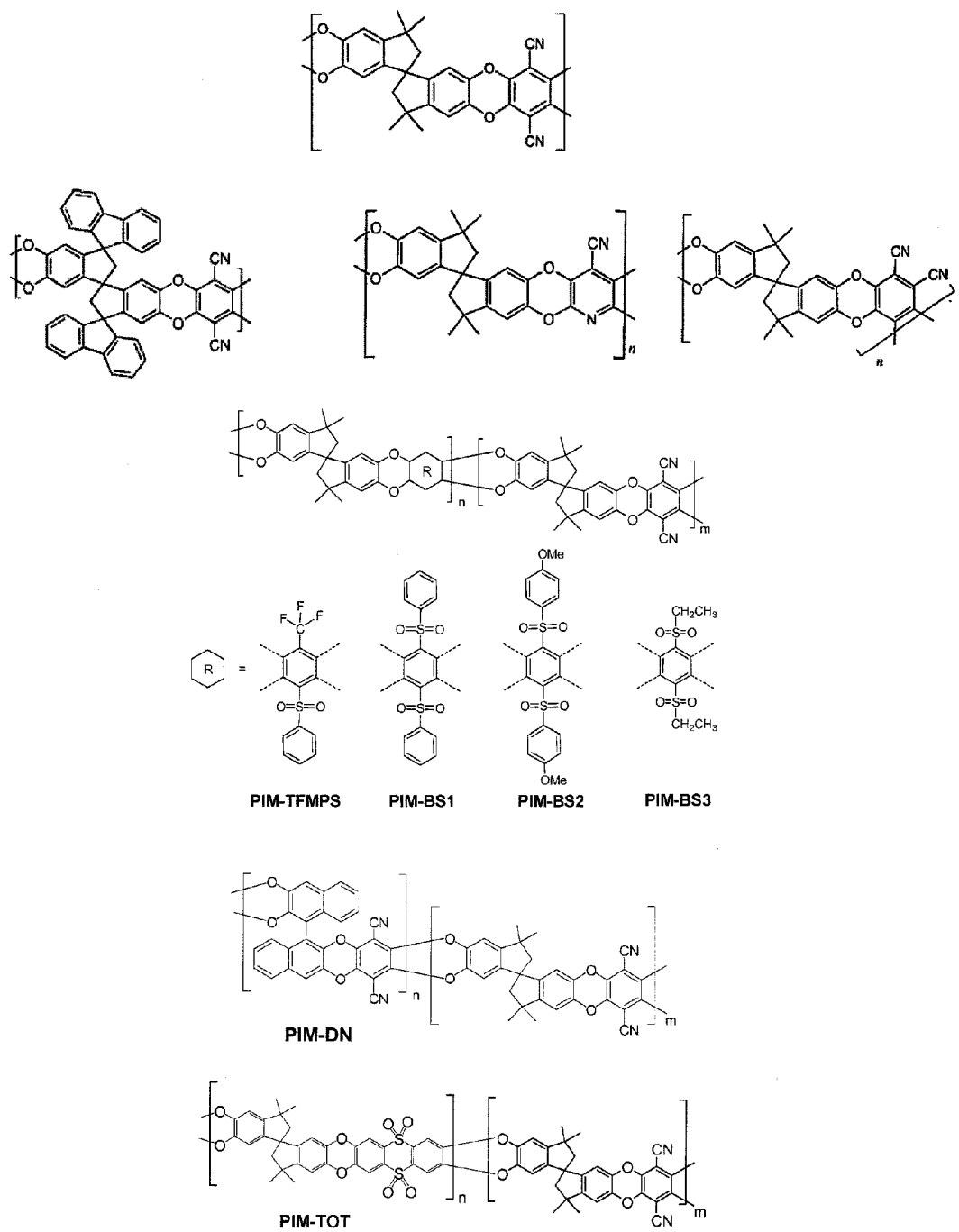
FIG. 1 depicts structures of some preferred PIM homo- and copolymers containing nitrile groups that serve as substrates for [2+3] cycloaddition reactions with azides.

Material And Methods
Materials

Dimethyfacetamide (DMAc), N-methylpyrrolidone (NMP), toluene, methanol (MeOH), potassium carbonate ($K_2CO_3$), sodium azide ($NaN_3$), zinc chloride ($ZnCl_2$), methylamine (40 wt % in $H_2O$), diisopropylamine, N,N-diisopropylethylamine and chloroform ($CHCl_3$) were purchased from Sigma-Aldrich and used as received. 5,5',6,6'-Tetrahydroxy-3,3,3',3'-tetramethylspirobisindane (TTSBI, Sigma-Aldrich) was purified by crystallization from methanol. Tetrafluoroterephthalonitrile (TFTPN, Matrix scientific) was purified by vacuum sublimation at 150° C. under inert atmosphere.

Characterization Methods

The structures of the polymeric materials were fully characterized using nuclear magnetic resonance (NMR) spectroscopy at different temperatures. NMR analyses were recorded on a Varian Unity Inova™ spectrometer at a resonance frequency of 399.961 MHz for $^1$H and 376.276 MHz for 19F. $^1$H and $^{19}$F NMR spectra were obtained from samples dissolved in $CDCl_3$ or DMSO-$d_6$ using a 5 mm pulsed field gradient indirect detection probe. The solvent signals ($CDCl_3$ $^1$H 7.25 ppm; DMSO-$d_6$ $^1$H 2.50 ppm) were used as the internal references. An external reference was used for $^{19}$F NMR: $CFCl_3$ 0 ppm.

Molecular weight and molecular weight distributions were measured by GPC using Ultrastyragel™ columns and THF as the eluent at a flow rate of 1 mL/min. The values obtained were determined by comparison with a series of polystyrene standards.

FTIR spectra were recorded on Thermo Scientific FTIR microscope (model Nicolet 6700) with film samples at 8 cm$^{-1}$ resolution over the 400-4000 cm$^{-1}$ range. Each sample was scanned 64 times.

Polymer thermal degradation curves were obtained from thermogravimetric analysis (TGA) (TA Instruments, model Q-5000IR). The TGA furnace is equipped with an interface for mass spectrometer detection of the off-gasses released from the polymer decomposition. Polymer samples for TGA were initially heated to 150° C. (or 120° C. for PILIM TGA curves) under nitrogen gas and maintained at that temperature for 1 h for moisture removal and then heated to 600° C. at 10° C./min (or at 5° C./min for PILIMs) for degradation temperature measurement. A mass spectrometer MS model Thermostar™ from Pfeiffer Vacuum was used to detect gas driven off from thermally degraded samples in the TGA instrument.

Glass transition temperatures ($T_g$) were observed from differential scanning calorimetry (DSC) (TA Instruments model 2920), and samples for DSC were heated at 10° C./min under a nitrogen flow of 50 mL/min, then quenched with liquid nitrogen and reheated at 10° C./min for the $T_g$ measurement.

Dense polymer films for gas permeability measurements were prepared from 1-2 wt % PIM solutions in chloroform, NMP or DMAc. Solutions of PIM-1 and tetrazole-modified PIMs were filtered through 0.45 μm polypropylene filters and then poured into glass or TeflonTM Petri dishes in a glove box at room temperature (for $CHCl_3$) or 80° C. (for NMP or DMAc) and allowed to evaporate slowly for 1 day. The membranes were soaked in methanol and dried in a vacuum oven at 120° C. for 24 h, or were soaked in boiled water and dried naturally and then in a vacuum oven at 120° C. for 24 h. The resulting membranes with thickness in the range of 70-90 μm were bright yellow (for PIM-1) or brown yellow (TZ-PIMs and PILIMs) and flexible.

Permeability coefficients (P) of $N_2$, $O_2$, and $CO_2$ were determined at 25° C. at a feed pressure of 50 psig and atmospheric permeate pressure using the constant-pressure/variable-volume method. The permeation flow was measured using a bubble flow meter, with the exception of $CO_2$, which was measured by a mass flow meter (Agilent ADM 2000). P was calculated by using a following equation:

$$P = \left(\frac{273}{T}\right) \cdot \left(\frac{dV}{dt}\right) \cdot \left(\frac{l}{\Delta p \cdot A}\right)$$

where dV/dt is the permeate-side flow rate, and T is the operation temperature (K). The membrane effective area was 9.6 cm$^2$ (TZ-PIMs) or 0.78 cm$^2$ (PILIMs).

Preparation of PIM-1

A literature procedure was employed to prepare PIM-1 (Du 2008a). The $M_n$ was 70,000 Da, with a PDI of 2.3 for comparative experiments with TZ-PIMs. The $M_n$ was 86,000 Da, with a PDI of 2.0 for comparative experiments with PILIMs.

EXAMPLE 1

Preparation of Tetrazole-Containing PIMs (TZ-PIMs)

From PIM-1 Solution:

PIM-1 was dissolved in NMP (1-3 g in 20 mL of solvent). $NaN_3$ and anhydrous $ZnCl_2$ with different mol equiv versus the nitrile groups were added, and the reaction mixture was stirred at 120° C. for different times according to the conversion required (see Table 1, TZ-PIMs4-7). After cooling to 60° C., 15 mL of diluted HCl (1:10 by volume in water) was added, and the reaction mixture was kept at this temperature for 3-5 h. The PIMs thus obtained were then precipitated into excess aqueous HCl, filtered, washed on the filter with the same HCl solution and water, and dried in vacuum at 120° C.

From PIM-1 Films:

PIM-1 films were immersed in mixed solvent of NMP/$H_2O$ (v:v=1:2). $NaN_3$ (20 mol equiv versus the nitrile groups) and anhydrous $ZnCl_2$ (10 mol equiv versus the nitrile groups) were added. The reactions were run under different conditions as follows and as illustrated in Table 1. The conditions were: (1) 60° C. ultrasonic condition for 2 hours; (2) 600 W microwave to reflux for 1 hour; and (3) heating to reflux for 2 days. After cooling to 60° C., 15 mL of diluted HCl (1:10 by volume in water) was added, and the films were maintained at this temperature for 3-5 h. The PIM films (TZ-PIMs-ultrasonic, -microwave or -heat) thus obtained were washed with dilute HCl and water, and dried in vacuum at 120° C.

TABLE 1

Conditions for Preparing TZ-PIMs

| Sample No. | —CN:$NaN_3$:$ZnCl_2$ | Reaction time | Solvent | Temperature |
|---|---|---|---|---|
| TZ-PIM1. Film-Microwave | 1:20:10 | 1 h | NMP/$H_2O$ (v:v = 1:2) | Reflux |
| TZ-PIM2. Film-Ultrasonic | 1:20:10 | 2 h | NMP/$H_2O$ (v:v = 1:2) | 60° C. |
| TZ-PIM3. Film-Heating | 1:20:10 | 2 d | NMP/$H_2O$ (v:v = 1:2) | Reflux |
| TZ-PIM4 | 1:1:0.5 | 2 d | NMP | 120° C. |
| TZ-PIM5 | 1:4:2 | 2 d | NMP | 120° C. |
| TZ-PIM6 | 1:4:2 | 4 d | NMP | 120° C. |
| TZ-PIM7 | 1:4:2 | 8 d | NMP | 120° C. |
| TZ-PIM8 | 1:4:4 | 2 d | NMP | 120° C. |
| TZ-PIM9 | 1:4:4 | 8 d | NMP | 120° C. |

Initially, two approaches for preparing TZ-PIMs were considered: (1) direct polycondensation of 2,3,5,6-tetrafluoro-1,4-ditetrazole monomer and TTSBI; and (2) by post-polymerization modification of nitrile groups on PIM-1. However, the first approach was abandoned, since the attempted synthesis of the tetrafluoroditetrazole monomer by reaction of tetrafluoroterephthalonitrile with $NaN_3$ and anhydrous $ZnCl_2$ in NMP solution at room temperature led to extremely low product yields and resulted in darkly colored side-products. The [2+3] cycloaddition "Click chemistry" type post-polymerization modification has been mentioned as a possible method for the functionalization of polymeric materials (Binder 2007). Click reactions are traditionally defined by a gain of thermodynamic enthalpy of at least 20 kcal/mol (Kolb 2001) leading to reactions characterized by high yields, insensitivity to solvents, tolerance to various types of interfaces, and high selectivity. Microwave-assisted cycloadditions of nitriles with $NaN_3$ was also reported as a drastic reaction condition (Shie 2007) for direct conversion of nitrile to tetrazoles in aqueous media. In the present work, different reaction conditions were investigated. The PIM-1 used as starting material for the Click reaction was gel-free and had a high molecular weight (e.g. $M_n$=70,000, PDI=2.3), which was obtained under an optimized polycondensation process (Du 2008a). Dense PIM-1 films were prepared from polymer solutions in chloroform and the resulting membranes with thicknesses in the range of 70 µm to 90 µm. Scheme 2 shows possible resulting repeat units derived from different degrees of cycloadditions. Polymer repeat units may contain zero, one or two nitrile groups and correspondingly have two, one or zero tetrazole groups.

Scheme 2 - Reaction scheme for the [2 + 3] cycloaddition click reaction of PIM-1 to a polymer containing tetrazole groups.

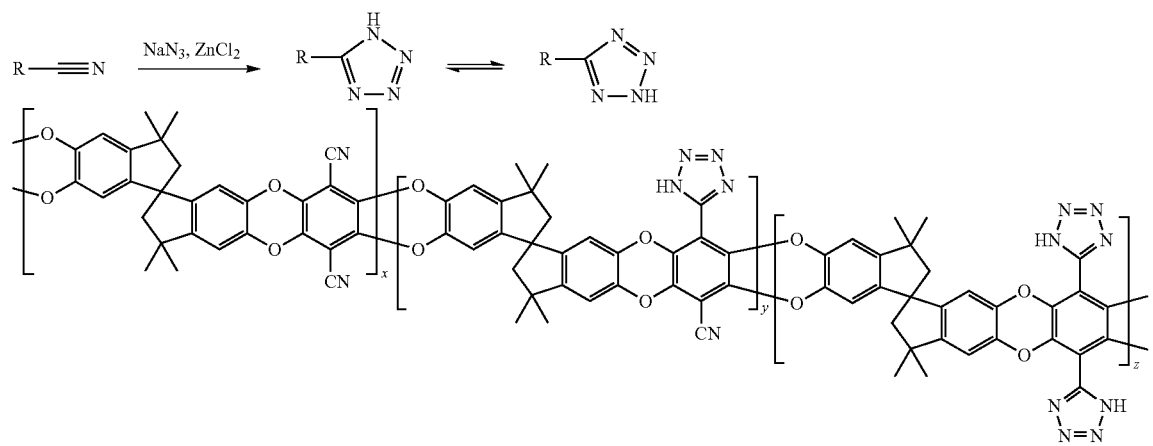

At first, the [2+3] cycloaddition reactions for nitriles on PIM-1 films were carried out by microwave or ultrasonic-assisted methods in aqueous NMP solutions. For comparison, the reaction on PIM-1 film was run in the same medium at reflux temperature for 48 h. TZ-PIM films were prepared from PIM-1 films under different conditions: 600 W microwave for 1 h; 60° C. ultrasonic condition for 2 h and refluxing the films for 2 days. In contrast with the previous report, the microwave-assisted method was not efficient for the [2+3] cycloaddition modification of PIM-1 films to those containing tetrazole, since the conversion was incomplete. Only about 5-10% of the nitrile groups of PIM-1 films were converted to tetrazole groups, as shown by FTIR and 1H NMR measurements. Furthermore, only small conversions were observed among all the PIM film samples obtained by microwave-assisted method, ultrasonic-assisted method or refluxing method. Although [2+3] cycloaddition Click reactions are highlighted as being effective for various types of interfaces, this was not the case with PIM films, perhaps due to limited access of the reagents ($NaN_3$ and $ZnCl_2$) into the PIM-1 dense film.

PIM-1 was also solution-modified by a one-pot procedure in NMP solution with different ratios of $NaN_3$ and $ZnCl_2$ at the elevated temperature (120° C.) for reaction times of 2-8 d, resulting in TZ-PIM. In comparison to the modification of PIM-1 films, the solution method for PIM-1 in NMP was easier to control and provided higher conversion rates. When 1 mol equiv of $NaN_3$ and $ZnCl_2$ versus nitrile groups present in PIM-1 was used, approximately 30% of the nitrile groups were converted to tetrazole after 2 d. When the mol ratio of azide and Lewis acid to nitrile was increased to 4, approximately 50-60% of the nitrile groups were converted to tetrazole in the same time period, demonstrating that the modification was more efficient with higher reagent concentrations. Using the same mol excess of reagent, no unreacted nitrile groups could be observed in the FTIR spectrum of the product after 8 d, indicating complete conversion to tetrazole.

EXAMPLE 2

NMR Characterization of TZ-PIMs

TZ-PM6 and TZ-PIM7 were characterized by $^1H$ and $^{19}F$ NMR spectroscopy. Comparative $^1H$ NMR spectra of PIM-1 in $CDCl_3$ and TZ-PIMs (TZ-PIM6 and TZ-PIM7) in DMSO-$d_6$ are displayed in FIG. 2 along with signal assignments derived from 2D-NMR.

Figure 2:
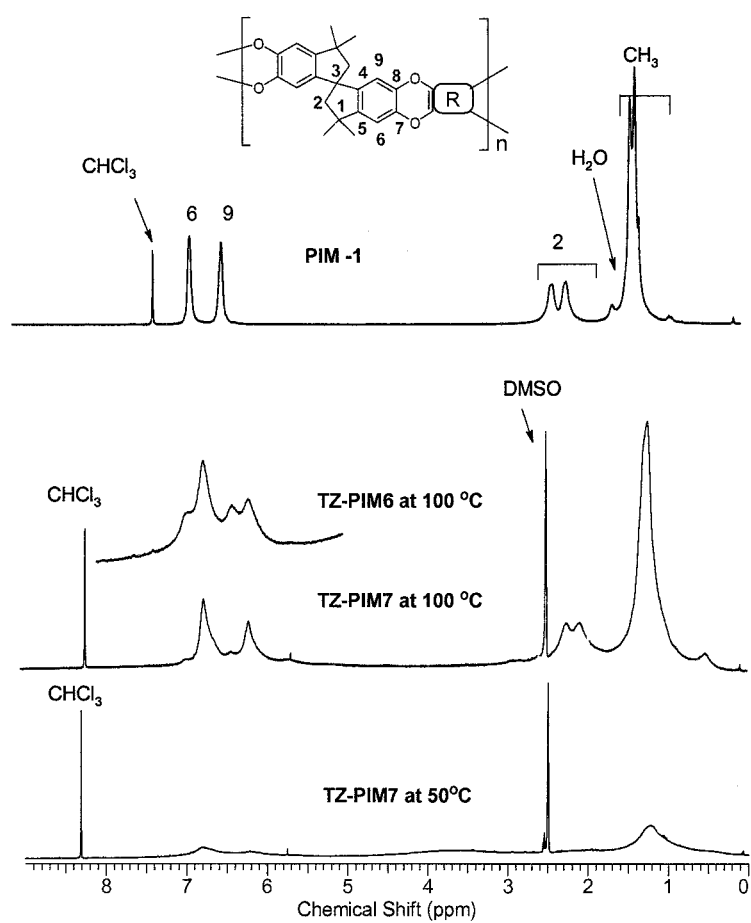
FIG. 2 depicts comparative $^1$H NMR spectra of PIM-1 and TZ-PIMs.

The intensities and the shapes of the TZ-PIM polymer $^1H$ NMR signals were monitored at different NMR probe temperatures: 23° C., 50° C., 80° C. and 100° C. The observed signal (at 100° C.) intensity ratio for the TZ-PIM7 aromatic (6.73, 6.19 ppm, H-6, 9) and aliphatic (0.25-2.4 ppm, H-2 and $CH_3$) regions was exactly 4H : 16H as expected from the molecular structure. Furthermore, at low temperature the intensity of all the signals in the 0.5-7.0 ppm area increased with increasing temperature. It is well known in NMR spectroscopy that changes in the sample temperature affect the mobility of the molecules, and hence, the intensity and shape of the signals. This is particularly noticeable with protons involved in hydrogen bonding (exchange rate, electron density around the H nuclei (Silverstein 2005)). The spectra of FIG. 2 are a good example of what can happen to the intensity and shape of proton signals when H-bonding is affected by temperature changes. It is worth mentioning that the spectrum of TZ-PIM6 also shown in FIG. 2 (100° C.) displayed four peaks at 6.92, 6.73, 6.35 and 6.19 ppm due to the shielding effects of —CN and tetrazole groups (Du 2009a), which proves the conversion of —CN to tetrazole groups after the [2+3] cycloaddition click reaction. Finally, the polymers were scanned for $^{19}F$ NMR signals that might arise from incomplete ladder polymer formation, but no fluorine signals were detected.

EXAMPLE 3

FTIR Characterization of TZ-PIMs

Figure 3:
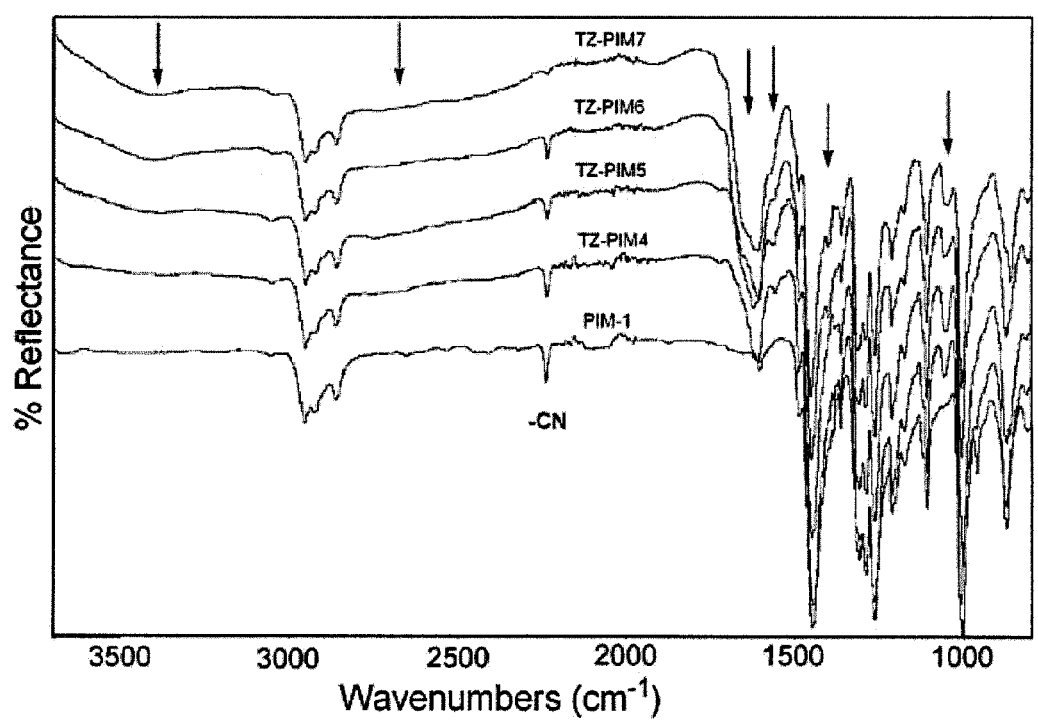
FIG. 3 depicts comparative FTIR spectra PIM-1 and TZ-PIMs.

The FTIR spectra of the progress of reactions at 120° C. at different reaction times to produce TZ-PIM (4-7) are shown in FIG. 3. PIM-1 shows the characteristic nitrile absorption band at 2238 $cm^{-1}$, while the absence of absorption bands in the range of 3000 to 3600 $cm^{-1}$ indicates that no N—H groups are present. After a two day [2+4] cycloaddition Click reaction at 120° C., the relative intensity of the nitrile absorption band decreased compared with other bands (TZ-PIM4 and 5). Broad absorption bands are observed in samples TZ-PIM 6 and 7 in the range of 3000 $cm^{-1}$ to 3600 $cm^{-1}$, corresponding to N—H stretching vibrations with N—H•••N bond, and in the range of 2300 $cm^{-1}$ to 2800 $cm^{-1}$, attributed to vibrations of quaternary nitrogen atom (Vygodskii 2008). A narrow intense absorption near 1580 $cm^{-1}$ arises due to the stretching vibration of the N=N and N—H groups which implies that some of the nitrile groups were converted into tetrazole groups (Disli 2009). It is notable there are small new bands near 1510 $cm^{-1}$, 1400 $cm^{-1}$ and 1100 cm–1, which are due to C=N stretching (Darkow 1997) and bending vibrations of the characteristic tetrazole ring, respectively. The relative height of the N=N stretching band increased in an observable manner and the nitrile absorption band decreased until it almost disappeared after an 8 day reaction time, indicating that nitrile groups were completely converted into tetrazole groups.

EXAMPLE 4

TGA And DSC Characterization of TZ-PIMs

Figure 4:
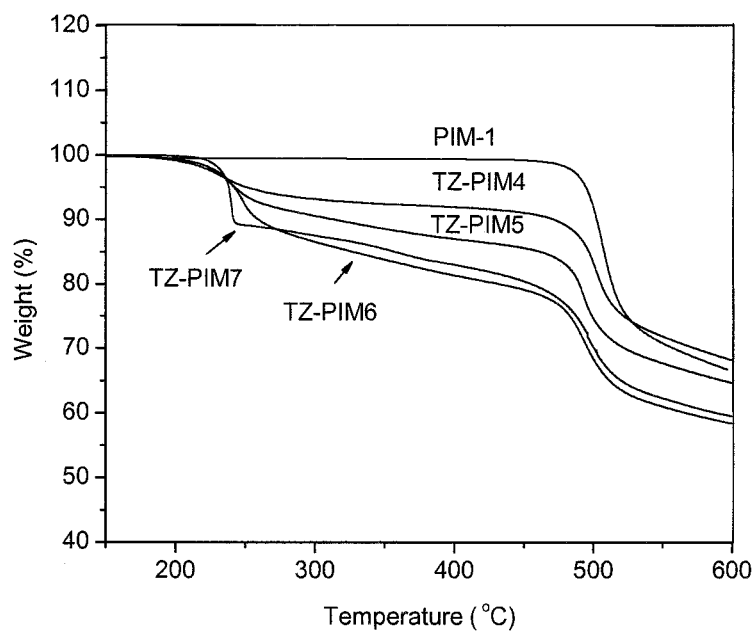
FIG. 4 depicts comparative TGA curves of PIM-1 and TZ-PIMs.

The synthesized TZ-PIMs with pendant tetrazole groups were further characterized by thermal gravimetric analysis (TGA) and differential scanning calorimetry (DSC), and the results compared to the nitrile precursor PIM-1 (FIG. 4). None of the polymers have a discernable $T_g$ in the measured range of 50° C. to 350° C. The TZ-PIMs were further characterized by TGA, and the results are compared to the PIM-1 precursor. Generally, nitrile-containing polymers have high thermal stability, likely due to strong dipolar interactions. In all cases, the TZ-PIMs decompose at lower temperature compared to PIM-1. It is observed that under nitrogen, at a heating rate of 10° C./min, TZ-PIMs decompose thermally in two stages, the first being the degradation of the tetrazole ring (around 170° C.) and the second the thermo-oxidative destruction of the polymeric residue (approximately 488° C.). TZ-PIM7 was tested by TGA-MS using 30 mL/min of He as the purge gas and a 5° C./min ramping rate. The gases released from the polymer decomposition were analyzed by MS (mass 1-300) and correlated with the TGA curve. The polymer lost 12% weight between 170° C. and 300° C. During that same period of time the MS signals for masses 14, 28 and 29 increased, peaked and then decreased. Those significant signals are typical of nitrogen gas being detected by the MS. When the heating rate was higher than 10° C./min, explosive decomposition of the polymer was observed between 170° C. and 300° C. All the evidence indicate that the first decomposition product is $N_2$ by extrusion from tetrazole groups Prokudin 1996). Furthermore, the about 12% weight loss for TZ-PIM7 at the first stage is close to the about 15% calculated weight loss that would occur from complete tetrazole decomposition, which is further evidence for the presence of tetrazole structures on the main chains. A higher ratio of nitrile groups in TZ-PIMs results in a smaller observed weight loss from the first decomposition stage. In summary, the PIM-1 was thermally more stable than the TZ-PIMs, however, all TZ-PIMs still show good thermal stability, even after complete conversion of nitrile to tetrazole groups by the [2+3] cycloaddition reaction.

EXAMPLE 5

Solubility Characterization of TZ-PIMs

The solubility of the TZ-PIMs was distinctly different when compared to PIM-1. PIM-1 is readily soluble in tetrahydrofuran (THF), dichloromethane ($CH_2Cl_2$), chloroform ($CHCl_3$), but insoluble in polar aprotic solvents such as dimethylformamide (DMF), dimethylacetamide (DMAc) and N-methylpyrrolidone (NMP). After the [2+3] cycloaddition reaction at 120° C. for 2 days, the resulting TZ-PIM5 was no longer soluble in $CH_2Cl_2$ and $CHCl_3$, but it was still partly soluble in THF. With extended cycloaddition reaction, THF was a non-solvent and DMF, DMAc and NMP were good solvents for the TZ-PIM6 and 7, indicating that the TZ-PIMs still have good solvent processability.

Dense TZ-PIMs films were prepared from polymer (TZ-PIM4 and 5) solutions in DMAc and the thickness of the resulting membranes was in the range of 70 µm to 90 µm. TZ-PIM5 films were darker in color when compared to fluorescent yellow PIM-1 films. With extended reaction times and high tetrazole content in the TZ-PIMs, the films became more brittle, possibly due to additional rigidity and hydrogen bonding. However, flexible films for gas transport testing could readily be cast from DMAc solutions of TZ-PIM4 and TZ-PIM5.

EXAMPLE 6

Gas Permeability And Selectivity Characterization of TZ-PIMs

Figure 5:
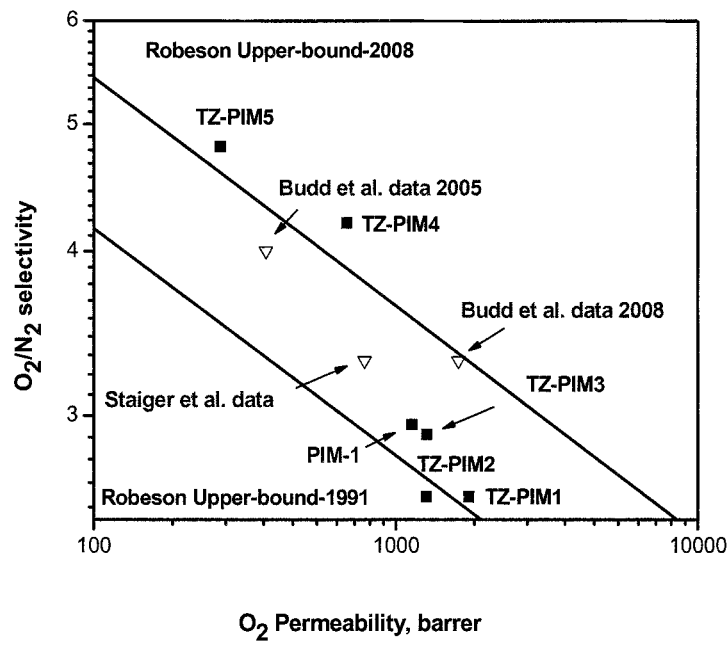
FIG. 5 depicts a graph of the relationship between $O_2$ permeability and $O_2/N_2$ selectivity for TZ-PIMs and PIM-1.
Figure 6:
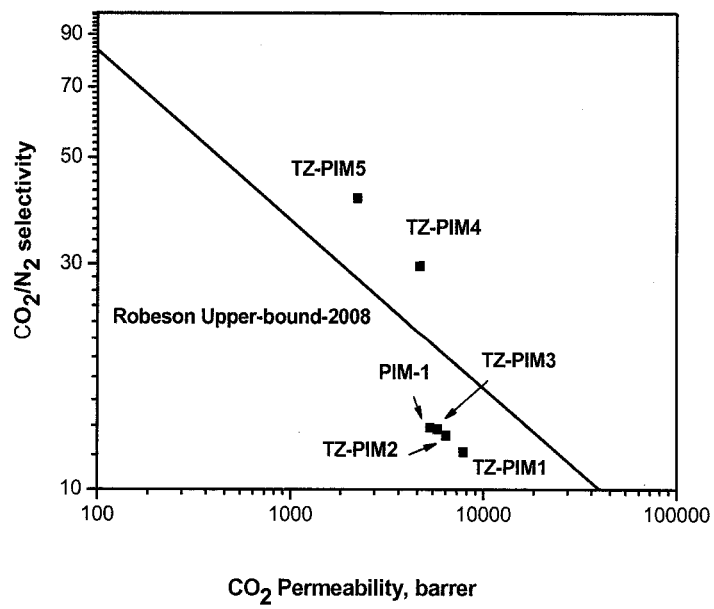
FIG. 6 depicts a graph of the relationship between $CO_2$ permeability and $CO_2/N_2$ selectivity for TZ-PIMs and PIM-1.

Gas permeabilities and selectivities of TZ-PIMs obtained under different reaction conditions follow a trade-off relationship, similar to that observed for many glassy or rubbery polymers. In general, higher permeability is gained at the cost of lower selectivity and vice versa. Pure-gas permeability coefficients (P) for $O_2$, $N_2$ and $CO_2$ were measured on polymer dense films of PIM-1 and TZ-PIM1-3 prepared by film modification and TZ-PIM4-5 prepared by solution modification using the [2+3] cycloaddition reaction with sodium azide. Higher tetrazole content TZ-PIM6-7 could not be measured due to film brittleness. A summary of the P values and ideal selectivities for various gas pairs are shown in Table 2. Gas permeability and selectivity of PIM-1 are known to be very sensitive to film preparation conditions and pre-treatment (Budd 2008). Consequently, there is variation between the previously reported permeability data and the present data for PIM-1 as shown in FIG. 5 and FIG. 6.

TABLE 2

Gas permeabilities and ideal selectivities of TZ-PIM1-5 and PIM-1

| Polymer | P (Barrer)[a] | | | $\alpha$[b] | |
|---|---|---|---|---|---|
| | $O_2$ | $N_2$ | $CO_2$ | $O_2/N_2$ | $CO_2/N_2$ |
| PIM-1 | 1129 | 391 | 5266 | 2.9 | 13.5 |
| TZ-PIM1 | 1743 | 668 | 7848 | 2.6 | 12 |
| TZ-PIM2 | 1259 | 494 | 6391 | 2.6 | 13 |
| TZ-PIM3 | 1263 | 429 | 5761 | 2.9 | 13.4 |
| TZ-PIM4 | 684 | 157 | 4653 | 4.3 | 29.6 |
| TZ-PIM5 | 261 | 54 | 2216 | 4.8 | 41.0 |

[a]Permeability coefficients measured at 25° C. and 50 psig feed pressure.
1 Barrer = $10^{-10}$ [$cm^3$(STP) · cm]/($cm^2$ · s · cmHg).
[b]Ideal selectivity $\alpha = (P_a)/(P_b)$.

It is likely that this difference arises from the post-treatment protocol for the membranes. Different from previous work, the TZ-PIM membranes were boiled in water first (with HCl, pH=4-5), in order to remove NMP. After several washes in water, they were soaked in methanol and then allowed to dry naturally. Finally, the membranes were dried in a vacuum oven for 24 h by gradually increasing the temperature from ambient to 120° C. For comparison, a PIM-1 membrane was treated identically.

The $O_2/N_2$ selectivities for PIM-1 are above the Robeson upper bound (Robeson 1991), with expected "trade-off" behavior between permeability and selectivity as shown in FIG. 5. TZ-PIM3 exhibited $O_2/N_2$ and $CO_2/N_2$ selectivity similar to PIM-1, with lower selectivities observed for TZ-PIM1-2. These results are consistent with the results of $^1$H NMR and FTIR which indicate the Click reaction conducted on the PIM-1 film was not effective under various heterogeneous conditions. However, TZ-PIM4 and TZ-PIM5 show extraordinary gas transport properties which are above the Robeson upper bound (Robeson 2008) for the $O_2/N_2$ and $CO_2/N_2$ gas pairs. Compared with PIM-1, the TZ-PIM series shows higher selectivity for gas pairs such as $O_2/N_2$ and $CO_2/N_2$, with a corresponding decrease in permeability. Selectivity coupled with high permeability even combines to exceed the Robeson upper-bound (Robeson 2008) for the $O_2/N_2$ and $CO_2/N_2$ gas pair. Thus, TZ-PIMs are particularly useful in membranes for oxygen enrichment or carbon dioxide separation.

Molecular modeling analysis using HyperChem™ 7.0 software reveals that the interchain distance of the polymer is not extensively altered by introducing tetrazole groups into the PIM. Tetrazole groups insert into the free volume spaces between the zigzag main chains, which may have an effect on interchain space filling. In addition, strong interchain hydrogen bonds may act to rearrange the chains, building up a network structure to increase the rigidity of polymer chains, which would lead to lower permeability and higher selectivity. This hypothesis is in good agreement with the observation that TZ-PIM5 forms a gel in DMF solution. The intrinsic intermolecular force of these TZ-PIMs is expected to be independent of processing. The amount of hydrogen bonding network structures can be controlled by the amount of $NaN_3$ and reaction time. Thus, post-modification of PIM-1 by various cycloaddition conditions is a convenient method to adjust or tune the gas permeability and selectivity.

The post-polymerization modification of nitrile-containing PIM-type materials via a [2+3] cycloaddition Click reaction with inorganic azide is an alternative and convenient approach for accessing structurally new PIMs. Optimal results were obtained when the reaction was carried out at 120° C. for 2-8 d using a ratio of the reagents —CN:$NaN_3$:

ZnCl$_2$ equal to 1:4:2. Partial and full cycloaddition in TZ-PIM results in markedly better solubilities in protic solvents than the starting materials, the TZ-PIMs being soluble in alkaline aqueous solutions, while maintaining good processability. All the TZ-PIMs exhibited lower thermal stability compared with PIM-1, the first degradation loss resulting from nitrogen extrusion from the tetrazole ring, but all TZ-PIMs were nevertheless quite thermally stable. TZ-PIM4 and TZ-PIM5 membranes in particular had good mechanical properties for gas permeability testing, and showed evident decreases in O$_2$, N$_2$ and CO$_2$ permeabilities and corresponding significant increases in pure-gas selectivities against N$_2$ with increasing tetrazole content. Both TZ-PIM4 and TZ-PIM5 had CO$_2$/N$_2$ and O$_2$/N$_2$ gas pair performance exceeding the 2008 Robeson upper-bound limit (Robeson 2008).

EXAMPLE 7

Preparation of A Tetrazole-Containing PIM Using Trimethylsilyl Azide

In a manner similar to Example 1, PIM-1 was reacted with trimethylsilyl azide (TMS-N$_3$) in the presence of copper (I) bromide (CuBr) in NMP at 80° C. for 2 days to form a tetrazole-containing PIM. The —CN:TMS-N$_3$:CuBr ratio was 1:1.5:1.5. A possible general mechanism for the reaction of TMS-N$_3$ with a nitrile is suggested by us and referenced in Jin 2008.

The reaction was followed by FTIR and the FTIR compared to that of PIM-1 and to that of the product of a PIM1-NaN$_3$ reaction. PIM-1 shows the characteristic nitrile absorption band at 2238 cm$^{-1}$, while the absence of absorption bands in the range of 3000 cm$^{-1}$ to 3600 cm$^{-1}$ indicate no N—H group is present. After a two day reaction of PIM-1 with trimethylsilyl azide at 80° C., the relative intensity of the nitrile absorption band decreased. The FTIR spectrum of PIM-1-trimethylsilyl azide is almost same as the one coming from PIM-1-NaN$_3$. Broad absorptions bands are observed in the range of 3000 cm$^{-1}$ to 3600 cm$^{-1}$, which likely correspond to N—H stretching vibrations with N—H•••N bond, and in the range of 2300 cm$^{-1}$ to 2800 cm-1, suggesting vibrations associated with quaternary nitrogen atom. A narrow intense absorption near 1580 cm$^{-1}$ arises due to stretching vibrations of the N═N and N—H groups, which imply that some of the nitrile groups were converted into tetrazole groups. It is notable there are small new bands near 1510 cm$^{-1}$, 1400 cm$^{-1}$, 1100 cm$^{-1}$, which are due to the C═N stretching and bending vibrations of the characteristic tetrazole ring, respectively.

Figure 7:
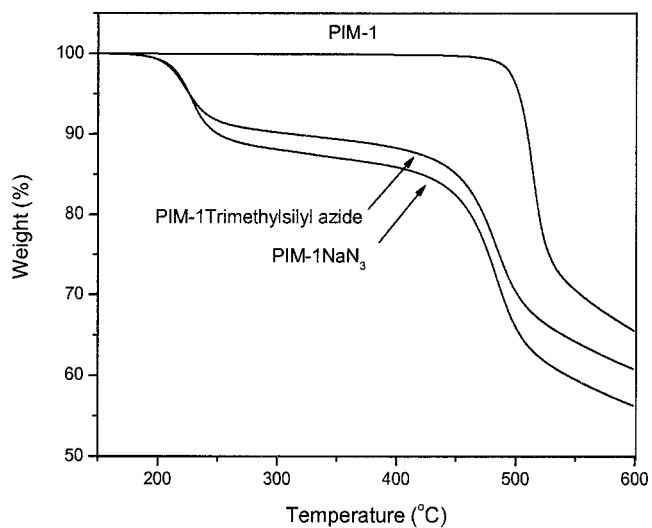
FIG. 7 depicts comparative TGA curves of PIM-1, a TZ-PIM made using $NaN_3$ and a TZ-PIM made using TMS-$N_3$.

Compared to PIM-1, the solubility of resulting polymer is quite poor in CHCl$_3$. However, it can be readily dissolved in NMP, DMF, DMAc, which strongly suggests that the [2+3] cycloaddition reaction occurred. The TGA results (FIG. 7) compared to PIM-1 and PIM-1-NaN$_3$ showed that PIM-1-trimethylsilyl azide and PIM-1-NaN$_3$ first decomposed between 160° C. and 250° C., suggesting degradation of the tetrazole ring (around 160° C.).

EXAMPLE 8

Preparation of A Tetrazole-Containing PIM Using Benzyl Azide

Figure 8:
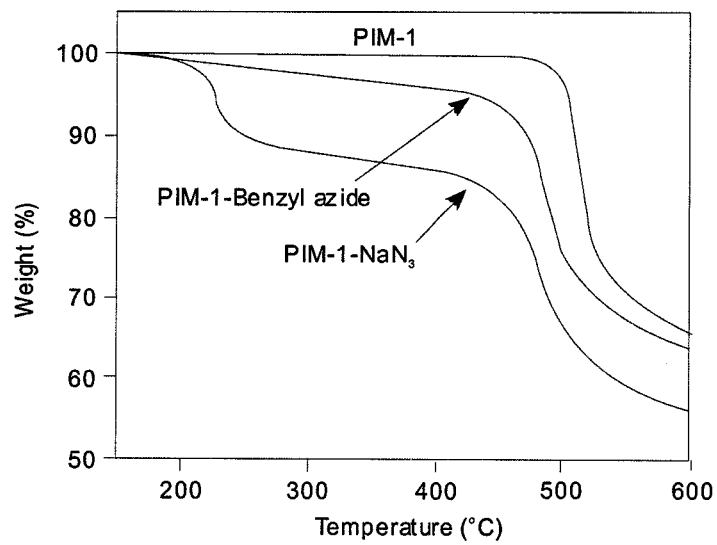
FIG. 8 depicts comparative TGA curves of PIM-1, a TZ-PIM made using $NaN_3$ and a TZ-PIM made using benzyl-$N_3$.

PIM-1-benzyl azide is prepared in a manner similar to Example 7 except that benzyl azide is used instead of TMS-azide and the temperature is 120° C. Different from PIM-1 and PIM-1-NaN$_3$ (polymer with tetrazole groups produced from PIM-1 and NaN$_3$), the solubility of PIM-1-benzyl azide is quite poor in CCl$_3$, THF, methanol, acetone, NMP, DMF and DMAc, which suggests a [2+3] cycloaddition reaction occurred. After a two day reaction of PIM-1 at 120° C. with benzyl azide and CuBr, the relative intensity of the nitrile absorption band decreased in FTIR spectrum. A narrow intense absorption near 1580 cm$^{-1}$ arose. This is indicative of a stretching vibration of the N═N and N—H groups, which implies that some of the nitrile groups were converted into tetrazole groups. The TGA results (FIG. 8) compared to PIM-1 and PIM-1-NaN$_3$ showed that PIM-1-benzyl azide and PIM-1-NaN$_3$ first decomposed between 160° C. and 250° C., suggesting degradation of the tetrazole ring (around 160° C.).

EXAMPLE 9

Figure 9:
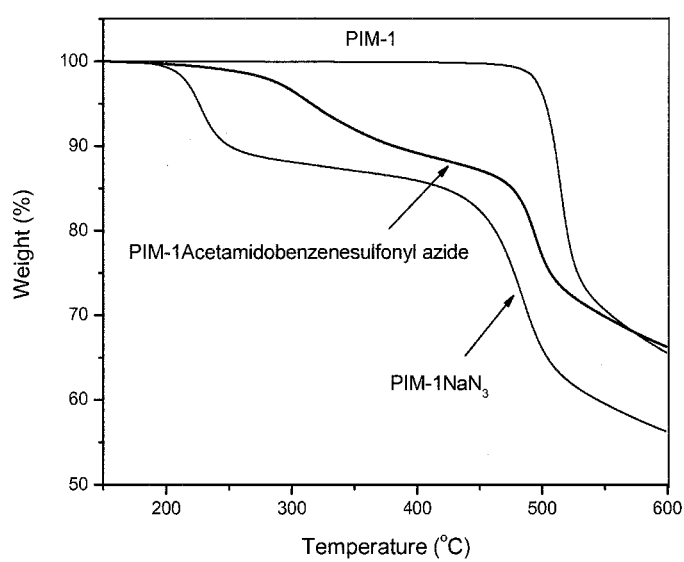
FIG. 9 depicts comparative TGA curves of PIM-1, a TZ-PIM made using $NaN_3$ and a TZ-PIM made using acetamidobenzensulfonyl-$N_3$.

Preparation of A Tetrazole-Containing PIM Using 4-Acetamidobenzenesulfonyl Azide PIM-1-acetamidobenzensulfonyl azide is prepared in a manner similar to Example 8 except that 4-acetamidobenzensulfonyl azide is used instead of benzyl azide. After a two day reaction of PIM-1 with 4-acetamidobenzenesulfonyl azide and CuBr at 120° C., the relative intensity of the nitrile absorption band decreased in the FTIR spectrum. Broad absorption bands were observed in the range of 3000 cm$^{-1}$ to 3600 cm$^{-1}$, which likely correspond to N—H stretching vibrations with N—H•••N bond. A narrow intense absorption near 1700 cm$^{-1}$ arose, which suggests the presence of —HNCO— groups in the polymer. The TGA results (FIG. 9) compared with PIM-1 and PIM-1-NaN$_3$ showed that product of reaction of PIM-1 and 4-acetamidobenzenesulfonyl azide first decomposed over 200° C. This suggests the degradation of the tetrazole ring. However, this substituted ring appears to more stable than PIM-1-NaN$_3$.

EXAMPLE 10

Preparation of Poly(Ionic Liquid)s of Intrinsic Microporosity (PILIMs)

Poly(ionic liquid)s with intrinsically microporous structures (PILIM-1, PILIM-2 and PILIM-3) were prepared from tetrazole-PIM (TZ-PIM-50, PIM-1 with 50% nitrile groups converted into tetrazole groups) with different amines in methanol at reflux temperature.

Thus, the tetrazole-containing PIM having 50% conversion of nitrile to tetrazole (TZ-PIM-50) was first prepared from PIM-1 solution. PIM-1 was dissolved in NMP (1-3 g in 20 mL of solvent). NaN$_3$ (4 equiv vs. nitrile groups) and anhydrous ZnCl$_2$ (2 equiv vs. nitrile groups) were added, and the reaction mixture was stirred at 120° C. for 5 days. After cooling to 60° C., 15 mL of dilute HCl (1:10 by volume in water) was added, and the reaction mixture was kept at this temperature for 3-5 h. The TZ-PIM-50 thus obtained was then precipitated in excess of the same aqueous HCl solution, filtered, washed on the filter with the HCl solution and water, and dried in vacuum at 120° C.

The PILIMs were prepared from TZ-PIM-50 as follows. 0.005 mol TZ-PIM-50 was dissolved in 50 mL methanol together with 0.015 mol amine (methylamine, diisopropylamine or N,N-diisoprpoylethylamine). The mixture was stirred at ambient temperature overnight, and then reprecipitated in water three times. The resulting PILIMs were dried in 80° C. vacuum oven for 2 days.

EXAMPLE 11

NMR Characterization of PILIMs

Figure 10:
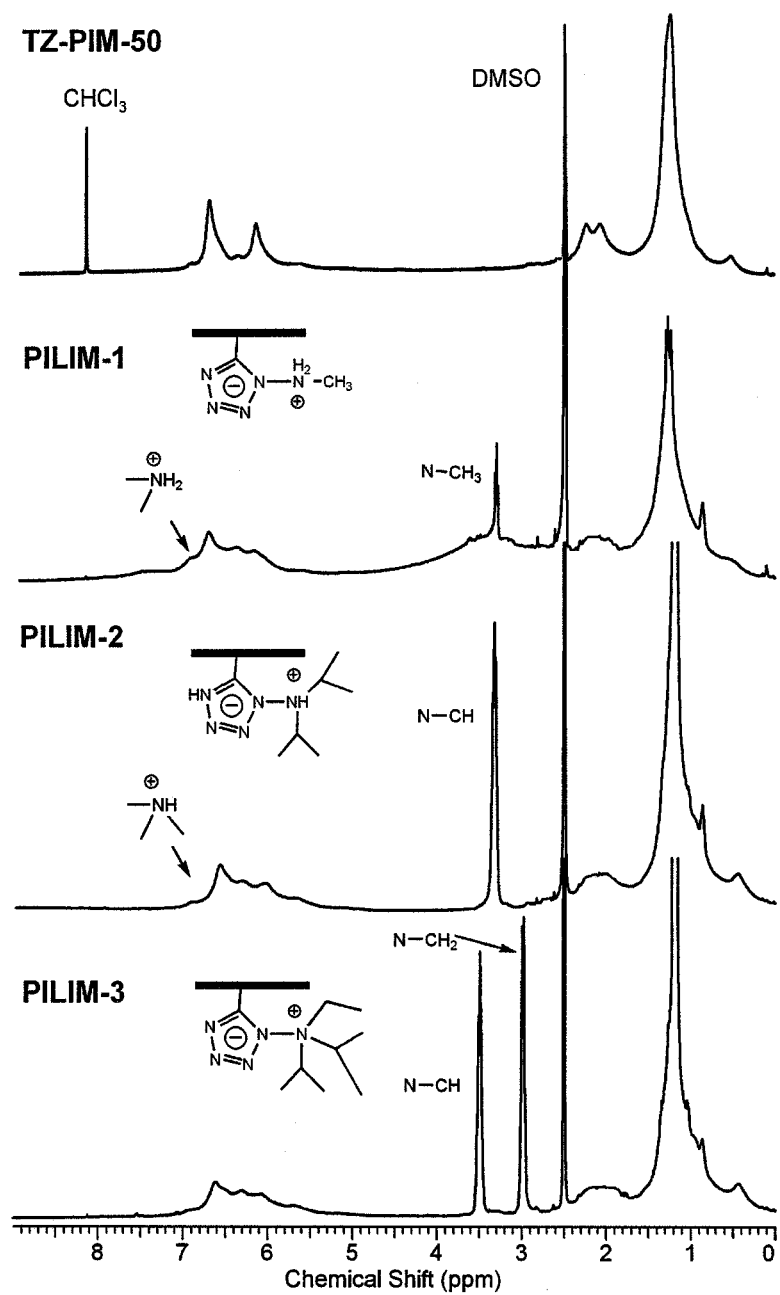
FIG. 10 depicts comparative $^1$H NMR spectra of TZ-PIM-50 and PILIMs.

The $^1$H-NMR spectra (FIG. 10) show exact structures of the PILIMs prepared in Example 9. The $^1$H-NMR signal intensities and the shapes of the TZ-PIM-50 and PILIM-1-3 polymers were monitored at 100° C. NMR probe temperatures. The observed peak intensity ratio of TZ-PIM-50 for the aromatic (6.2-6.8 ppm) and aliphatic (0.3-2.4 ppm, $CH_2$ and $CH_3$) regions was exactly 4H:16H as expected from the molecular structure.

For PILIM-1, except the similar aromatic and aliphatic regions, which integration was 4H:16H, there was an additional signal at around 3.3 ppm corresponding to N—$CH_3$, which integration was 3H. Furthermore, the shoulder signal at around 6.8-7.2 ppm arising from —NH protons changed shape with increasing temperature. It is well-known in NMR spectroscopy that changes in the sample temperature affect the mobility of the molecules, and hence, the shape of the signals. This is particularly evident with protons involved in hydrogen bonding (exchange rate, electron density around the H nuclei), while other aromatic and aliphatic protons are often left unchanged. A drop of $D_2O$ was added into the NMR tube and its immediate effect was observed in the $^1$H-NMR spectrum. The —NH protons exchanged with the deuterium nuclei, proving the presence of labile protons from the —NH groups.

For PILIM-2, compared to TZ-PIM-50, the aromatic (6.2-6.8 ppm) and aliphatic (0.3-2.4 ppm, $CH_2$ from PIM main chain, $CH_3$ from main chain and N—$CH(CH_3)_2$) regions was 4H:24H. The sharp signal around 3.4 ppm (m) corresponds to N—CH, with an integration of 2H. In addition the small shoulder peak around 6.8-7.2 ppm arises from —NH protons.

For PILIM-3, integration of the aromatic (6.2-6.8 ppm) and aliphatic (0.3-2.4 ppm, $CH_2$ from PIM main chain, $CH_3$ from main chain and N—$CH(CH_3)_2$) regions was 4H:27H, and there are two sharp signals (2H, N—$CH_2$, d, 2.9 ppm and 2H N—CH, m, 3.5 ppm). There is no obvious signals around 6.8-7.2 ppm area, which suggests that hydrogen bonded —NH protons doesn't occur.

EXAMPLE 12

FTIR Characterization of PILIMs

Figure 11:
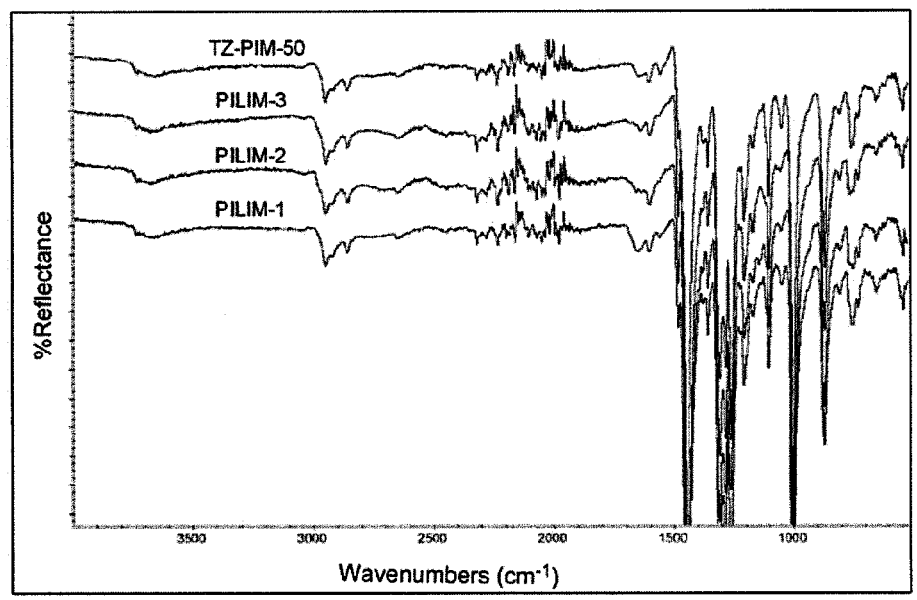
FIG. 11 depicts comparative FTIR spectra of TZ-PIM-50 and PILIMs.

FTIR data shows an absorption band at 2238 $cm^{-1}$ in PIM-1 (Mn, 86,000, PDI=2.0) that is assigned to nitrile groups, while the absence of absorption bands in the range of 3000 $cm^{-1}$ to 3600 $cm^{-1}$ indicates that no N—H group is present. FTIR spectra (FIG. 11) of TZ-PIM-1 and the PILIMs prepared in Example 9 show that in TZ-PIM-50, PILIM-1, PILIM-2 and PILIM-3, the absorption bands and their intensities are quite similar. The relative intensity of the nitrile absorption band in these polymers decreased to half (compared with PIM-1, the integration is about 50%). Broad absorption bands are observed in the range of 3000 $cm^{-1}$ to 3600 $cm^{-1}$, corresponding to N—H stretching vibrations with N—H•••N hydrogen bonding, and in the range of 2300 to 2800 $cm^{-1}$, attributed to vibrations of quaternary nitrogen atom (Vygodskii 2008). A narrow intense absorption near 1580 $cm^{-1}$ arises due to stretching vibrations of the N=N and N—H groups which imply that some of the nitrile groups were converted into tetrazole groups (Disli 2009). It is notable there are small new bands near 1510 $cm^{-1}$, 1400 $cm^{-1}$, 1100 $cm^{-1}$, which are due to the C=N stretching (Darkow 1997) and bending vibrations of the characteristic tetrazole ring, respectively.

EXAMPLE 13

TGA And DSC Characterization of PILIMs

Figure 12:
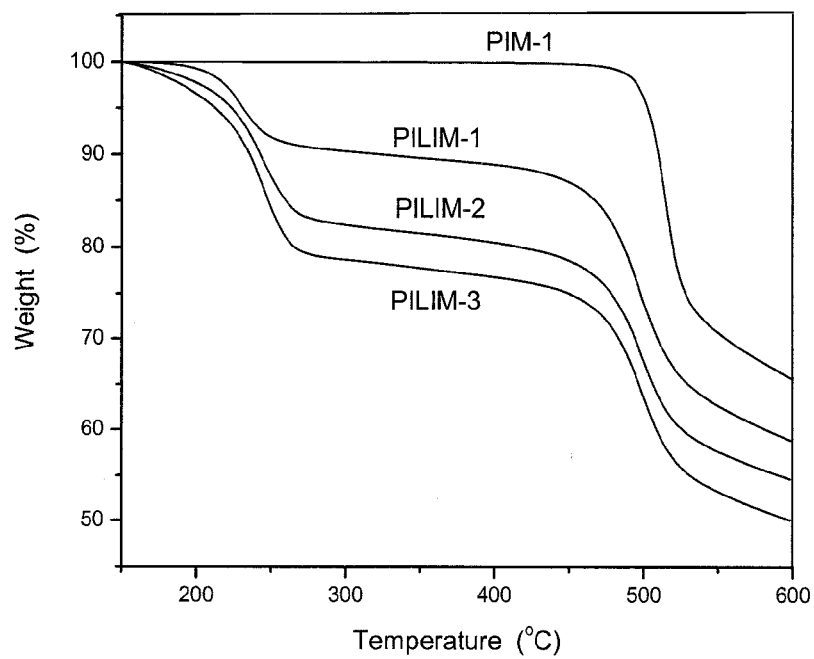
FIG. 12 depicts comparative TGA curves of PIM-1, PILIM-1, PILIM-2 and PILIM-3.

PIM-1, TZ-PIM-50, PILIM-1, PILIM-2 and PILIM-3 have no glass transition temperatures before 350° C. and DSC data show that they are amorphous. The TGA results compared to the nitrile-based precursor PIM-1 (FIG. 12) showed that PILIM-1, PILIM-2 and PILIM-3 decomposed at lower temperatures. It is observed under nitrogen, at a heating rate of 5° C./min, that PILIMs decompose thermally in two stages, the first being the degradation of the tetrazole ring (around 160° C.) and the second the thermo-oxidative destruction of the polymeric residue (around 488° C.). Around 11%, 18% and 21% weight loss for PILIM-1, PILIM-2 and PILIM-3 at the first stage is close to 50% of the calculated result of complete decomposition of these poly(ionic liquids) (23.8% 38.2% and 42.5%, respectively), which is further proof of different ionic liquids with tetrazole structures present on the main chains.

EXAMPLE 14

Solubility Characterization of PILIMs

The solubility of PILIM-1, PILIM-2 and PILIM-3 was similar to TZ-PIM-50, but distinctly different when compared to PIM-1. PIM-1 is readily soluble in tetrahydrofuran (THF), dichloromethane ($CH_2Cl_2$), chloroform ($CHCl_3$), but insoluble in polar aprotic solvents such as dimethylformamide (DMF), dimethylacetamide (DMAc), and N-methylpyrrolidone (NMP). TZ-PIM-50 was insoluble in THF, $CH_2Cl_2$ and $CHCl_3$, but readily soluble in DMAc and NMP. PILIM-1, PILIM-2 and PILIM-3 were also soluble in DMAc and NMP. When comparing TZ-PIM-50, PILIM-1, PILIM-2 and PILIM-3, gel forms more readily for DMF solutions of TZ-PIM-50 and primary amine (PILIM-1), due to strong hydrogen bonding while PILIM-3 exhibits the least gel formation. By visual observation, the degree of swelling of these polymers in chloroform increased in the order of PILIM-1, PILIM-2 and PILIM-3 and in methanol increased in the order of PILIM-3, PILIM-2 and PILIM-1. These interesting phenomena also indicate that tetrazole ionic liquids having different amine cations on the main chain change the solubility of the polymers.

EXAMPLE 15

Gas Permeability And Selectivity Characterization of PILIMs

Figure 13:
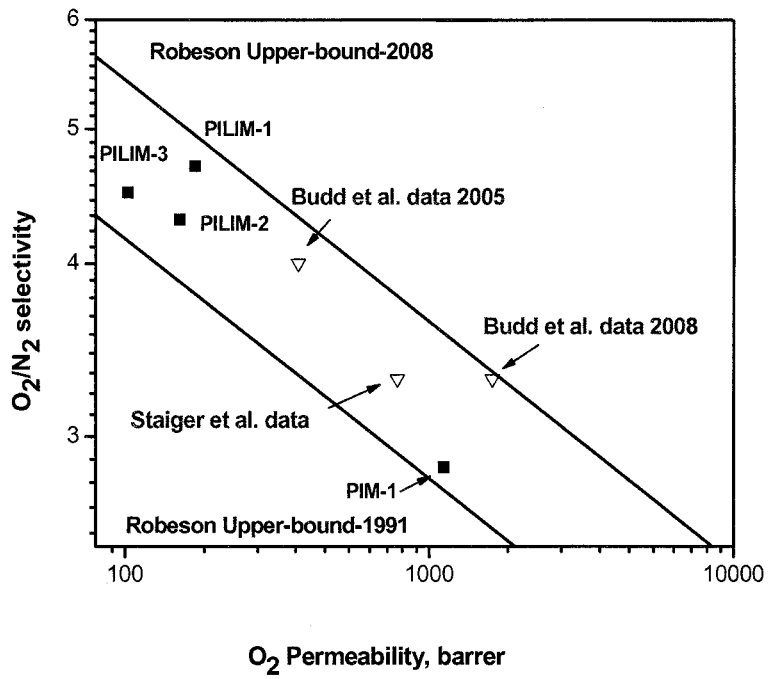
FIG. 13 depicts a graph of the relationship between $O_2$ permeability and $O_2/N_2$ selectivity for PILIM-1, PILIM-2, PILIM-3 and PIM-1.
Figure 14:
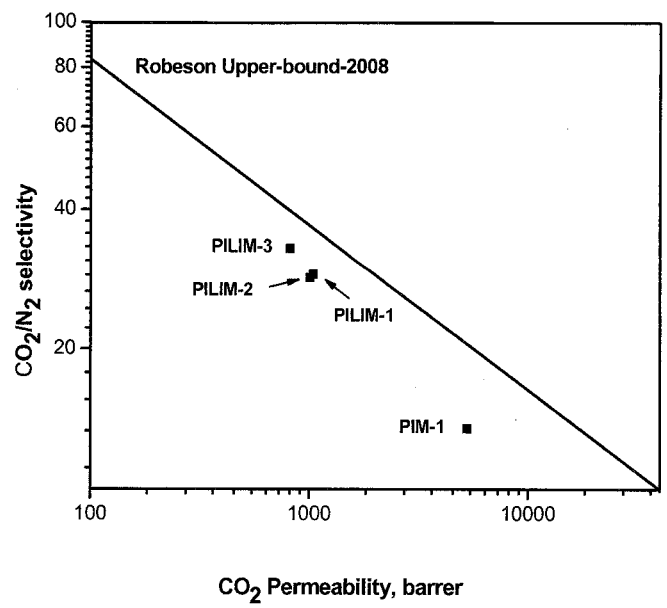
FIG. 14 depicts a graph of the relationship between $CO_2$ permeability and $CO_2/N_2$ selectivity for PILIM-1, PILIM-2, PILIM-3 and PIM-1; and, FIG. 15 depicts graphs comparing $N_2$ sorption isotherms at 77 K (FIG. 15A) and $CO_2$ sorption isotherms at 273 K (FIG. 15B) for PIM-1 and TZ-PIM9.

Specific surface area of PILIM particles was measured by BET. $S_{BET}$ was 0.29 $m^2/g$. Gas transport properties were measured at 100 psig. The permeabilities and selectivities of PILIM-1, PILIM-2 and PILIM-3 follow a trade-off relationship. In general, higher permeability is gained at the cost of lower selectivity and vice versa. Pure-gas permeability coefficients (P) were measured on polymer dense films of PIM-1, PILIM-1, PILIM-2 and PILIM-3 for $O_2$, $CO_2$ and $N_2$. A summary of these P values and ideal selectivities for various gas pairs is shown in Table 3. Gas permeability and selectivity of PIM-1 are known to be very sensitive to film preparation conditions and pre-treatment (Budd 2008). There is variation between the previously reported permeability data and the present data for PIM-1 as shown in FIG. 13 and FIG. 14.

TABLE 3

Gas permeabilities and ideal selectivities of PILIM-1-3 and PIM-1

| Polymer | P (Barrer)$^a$ | | | $\alpha^b$ | |
|---|---|---|---|---|---|
| | $O_2$ | $N_2$ | $CO_2$ | $O_2/N_2$ | $CO_2/N_2$ |
| PIM-1 | 1113 | 398 | 5500 | 2.85 | 13.8 |
| PILIM-1 | 169 | 36 | 1043 | 4.7 | 29 |
| PILIM-2 | 151 | 35 | 1010 | 4.3 | 29 |
| PILIM-3 | 102 | 23 | 817 | 4.5 | 33 |

$^a$Permeability coefficients measured at 25° C. and 100 psig feed pressure.
1 Barrer = $10^{-10}$ [cm$^3$(STP) · cm]/(cm$^2$ · s · cmHg).
$^b$Ideal selectivity $\alpha = (P_a)/(P_b)$.

The post-treatment protocol for the membranes results in differences in gas permeabilities. Because PILIMs swell in methanol to a certain degree, all PILIMs membranes were only treated in boiling water (with HCl, pH=5), in order to remove NMP and traces of salt, then allowed to dry naturally. Finally, the membranes were dried in a vacuum oven for 24 h by gradually increasing the temperature from ambient to 120° C. For comparison, PIM-1 membrane was treated identically. The $O_2/N_2$ selectivities for PIM-1 are close to the Robeson upper bound (Robeson 1991), with expected "trade-off" behavior between permeability and selectivity as shown in FIG. 13. The PILIMs exhibit lower gas permeabilities but higher selectivity compared to PIM-1 above the 1991 Robeson upper bound (Robeson 1991), even closer to the 2008 Robeson upper bound (Robeson 2008). Furthermore, the PILIMs show extraordinary gas transport behavior, placing it above the 2008 Robeson upper bound (Robeson 2008) for $CO_2/N_2$ gas pairs (FIG. 14).

From the viewpoint of molecular modeling analyses by using HyperChem™ 7.0 software, the interchain distance of the polymer is not extensively changed by introducing ionic liquid groups into the PIM. All the ionic liquid groups are likely situated in the spaces between the zig-zag main chains, which might have an effect on interchain space filling. In addition, the data from Table 3 showed that larger volumes of amine led to lower gas permeabilities, suggesting that the ionic liquid acts as interchain filling material. Thus, changing cations or anions in the poly (ionic liquid)s of intrinsic microporosity is a simple method to adjust or tune the gas permeability and selectivity.

Thus, intrinsically microporous poly(ionic liquid)s are polymeric materials, in which gas selectivity coupled with permeability combines to be close to or exceed the Robeson upper bound for $O_2/N_2$ and $CO_2/N_2$. These characteristics combined with $S_{BET}$ and $CO_2$ absorption properties provide polymers that are exceptionally promising as absorbents and membrane separation materials.

EXAMPLE 16

$CO_2$ Separation Performance of TZ-PIMs

In real gas mixtures (e.g. $CO_2/N_2$ or $CO_2/CH_4$), the separation factor from a mixed gas is typically lower than the permselectivity measured from single gas permeation measurement owing to plasticization and/or competitive sorption effects. In mixed gas separation, $CO_2$ molecules can swell the polymer matrix, causing the permeability of the slow gas (e.g. $N_2$) to increase beyond its pure gas permeability, which results in reduced selectivity. In the present invention, surprisingly, the mixed $CO_2/N_2$ selectivities in TZ-PIMs are higher than single gas selectivity data. When the $CO_2$ concentration in mixtures are increased from 10 to 40 mol %, the mixed gas selectivity (see Table 4) are higher than the pure gas selectivity, assuming a pore-blocking mechanism, whereby the $CO_2$ sorbed preferentially in TZ-PIMs hinders the transport of $N_2$.

TABLE 4

Pure and mixed gas permeabilities and ideal selectivities of TZ-PIMs and PIM-1

| Feed ($CO_2$ in $N_2$) | $CO_2$ and $N_2$ P (Barrer)$^a$ | | | $\alpha^b$ | | |
|---|---|---|---|---|---|---|
| | PIM-1 | TZ-PIM5 | TZ-PIM8 | PIM-1 | TZ-PIM5 | TZ-PIM8 |
| 20% | 10245 | 3314 | 4218 | 26.0 | 40.1 | 41.4 |
| 30% | 11095 | 3013 | 3952 | 28.6 | 38.5 | 41.3 |
| 40% | 9810 | 2906 | 3779 | 30.2 | 38.3 | 42.9 |
| 100% | 8461 | 2509 | 3076 | 12.3 | 28.9 | 30.5 |

Figure 15A:
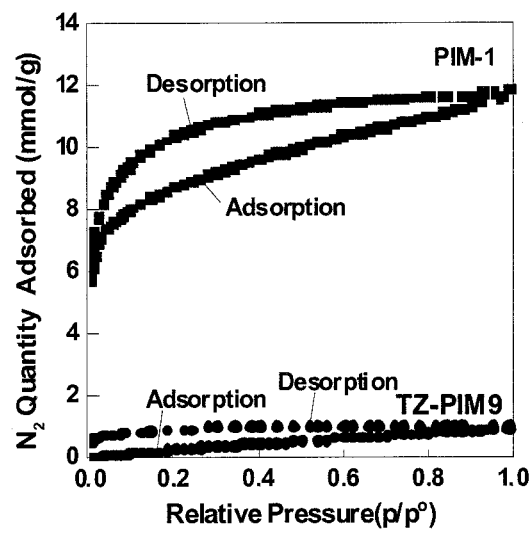
Figure 15B:
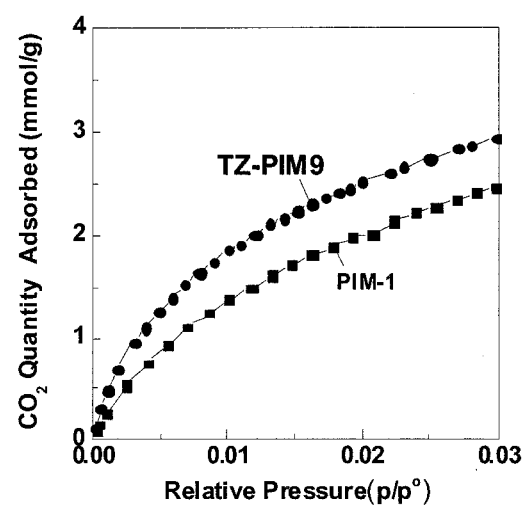

$N_2$ sorption isotherms at 77 K by Brunauer-Emmett-Teller (BET) for TZ-PIM9 (100% conversion of nitrile to tetrazole) are similar to common glassy polymers having low free volume elements, and totally different from those in PIM-1 as shown in FIG. 15A. The BET surface area in TZ-PIM9 is about 30 m$^2$ g$^{-1}$, which is a typical value for common glassy polymers such as polyimides (15-30 m$^2$ g$^{-1}$), and is markedly smaller than the BET surface area for PIM-1 (700 m$^2$ g$^{-1}$). In sharp contrast, the amount of $CO_2$ sorption at 273 K in TZ-PIM9 is higher than that in PIM-1 at low pressure ranges (see FIG. 15B), indicating that TZ-PIMs have better affinity for $CO_2$ molecules than PIM-1. This is likely mainly due to the tetrazole groups in TZ-PIMs which enhance both sorbing capability and solubility-selectivity toward any other gases. By improving chemical affinity as well as microporosity, TZ-PIMs can sorb $CO_2$ molecules more favorably in their empty cages than $N_2$ molecules. In addition, strong interchain interactions in TZ-PIMs provides rigid frameworks that help prevent polymer swelling caused by $CO_2$ molecules.

Thus, the present invention provides new microporous polymers having both intrinsic microporosity and $CO_2$-philic functional groups, resulting in remarkable gas transport properties combined with high selectivity over the current limitation of common organic polymers. Currently, economically practical $CO_2$ capture processes are industrially important for air purification and environmentally important for reduction of carbon dioxide's effect on global warming. Differing from other well-established membrane gas separations, highly permeable, selective $CO_2$ separations using polymeric membrane materials are still challenging because polymeric membranes suffer from low $CO_2$ flux and low selectivity particularly in gas mixtures. The presently described route to tune polymer properties for effective $CO_2$ separations and excellent processibility improves their potential utility for industrial $CO_2$ separation applications using polymeric gas separation membranes.

REFERENCES

The contents of the entirety of each of which are incorporated by this reference.

Aronson J B. (2004) Thesis: The Synthesis and Characterization of Energetic Materials from Sodium Azide. (Georgia Institute of Technology).

Bara J E, Lessmann S, Gabriel C J, Hatakeyama E S, Noble R D, Gin D G. (2007) *Ind. Eng. Chem. Res.* 46, 5397-5404.

Bates E D, Mayton R D, Ntai L, Davies J H. (2002) *J. Am. Chem. Soc.* 124, 926-927.

Binder W H, Sachsenhofer R. (2007) *Macromol. Rapid Commun.* 28, 15-54.

Blanchard L A, Hancu D, Beckman E J, Brennecke J F. (1999) *Nature.* 399, 28-29.

Budd P M, Ghanem B S, Makhseed S, McKeown N B, Msayeb K J, Tattershall C E. (2004a) *Chem. Commun.* 230-231.

Budd P M, Elabas E S, Ghanem B S, Makhseed S, McKeown N B, Msayeb K J, Tattershall C E, Wong D. (2004b) *Adv. Mater.* 16, 456-459.

Budd P M, McKeown N B, Fritsch D. (2005a) *J. Mater. Chem.* 15, 1977-1986.

Budd P M, Msayib K J, Tattershall C E, Reynolds K J, McKeown N B, Fritsch D. (2005b) *J. Membr. Sci.* 251, 263-269.

Budd P M, McKeown N B, Ghanem B S, Msayib K J, Fritsch D, Starannikova L, Belov N, Sanfirova O, Yampolskii Y, Shantarovich V. (2008) *J. Membr. Sci.* 325, 851-860.

Darkow R, Hartmann U, Tomaschewski G. (1997) *React. Funct. Polym.* 32, 195-207.

Demko Z P, Sharpless K B. (2001) *J. Org. Chem.* 66, 7945-7950.

Demko Z P, Sharpless K B. (2002a) *Angew. Chem., Int. Ed.* 41, 2110-2113.

Demko Z P, Sharpless K B. (2002b) *Angew. Chem., Int. Ed.* 41, 2113-2116.

Disli A, Salman M. (2009) *Russian Journal of Organic Chemistry.* 45, 151-153.

Du N, Robertson G P, Song J, Pinnau I, Thomas S, Guiver M D. (2008a) *Macromolecules.* 41, 9656-9662.

Du N, Song J, Robertson G P, Pinnau I, Guiver M D. (2008b) *Macromolecular Rapid Communications.* 29, 783-788.

Du N, Robertson G P, Pinnau I, Guiver M D. (2009a) *Macromolecules.* 42, 6023-6030.

Du N, Robertson G P, Pinnau I, Thomas S, Guiver M D. (2009b) *Macromol. Rapid Commun.* 30, 584-588.

Du N, Robertson G P, Song J, Pinnau I, Guiver M D. (2009c) *Macromolecules.* 42, 6038-6043.

Earle M J, Seddon K R. (2002) *ACS Symp. Ser.* 819, 10-25.

Ferguson L, Scovazzo P. (2007) *Ind. Eng. Chem. Res.* 46, 1369.

Gan Q, Rooney D, Xue M L, Thompson G, Zou Y. (2006) *J. Membr. Sci.* 280, 948-956.

Himo F, Demko Z P, Noodleman L, Sharpless K B. (2003) *J. Am. Chem. Soc.* 125, 9983-9987.

Hu X, Tang J B, Balsig A, Shen Y Q, Radosz M. (2006) *J. Membr.Sci.* 281, 130-138.

Huisgen R, Szeimies G, Möbius L. (1967) *Chem. Ber.* 100, 2494-2507.

Jin T, Kitahara F, Kamijo S, Yamamoto Y. (2008) *Chemistry—An Asian Journal.* 3, 1575-1580.

Kolb H C, Finn M G, Sharpless K B. (2001) *Angew. Chem. Int. Ed.* 40, 2004-2021.

Laas, H-J, Halpaap R, Richter F, Kocher J. (2003) United States patent publication 2003/0204041.

McKeown N B, Makhseed S. (2003) International Patent Publication WO 03/000774.

McKeown N B, Budd P M, Msayeb K J, Ghanem B S, Kingston H J, Tattershall C E, Makhseed S, Reynolds K J, Fritsch D. (2005a) *Chem. Eur. J.* 11, 2610-2620.

McKeown N B, Budd P M, Msayib K, Ghanem B. (2005b) Microporous polymer material. International Patent Publication WO 2005/012397.

Morgan D, Ferguson L, Scovazzo P. (2005) *Ind. Eng. Chem. Res.* 44, 4815.

Plechkova N V, Seddon K R. (2008) *Chem. Soc. Rev.* 37, 123-150.

Prokudin V G, Poplaysky V S, Ostrovskii. (1996) *Russ. Chem. Bull.* 45, 2094-2100.

Robeson L M. (1991) *J. Membr. Sci.* 62, 165.

Robeson L M. (2008) *J. Membr. Sci.* 320, 390-400.

Scovazzo P, Kieft J, Finan D A, Koval C, DuBois D, Noble R. (2004) *J. Membr. Sci.* 238, 57.

Shie J, Fang J J. (2007) *Org. Chem.* 72, 3141-3144.

Silverstein R M, Webster F X. (2005) *Spectrometric Identification of Organic Compounds.* John Wiley & Sons, Inc. 6th ed.; p. 163-166.

Staiger C L, Pas S J, Hill A J, Cornelius C. (2008) *J. Chem. Mater.* 20, 2606-2608.

Tang J B, Sun W L, Tang H D, Radosz M, Shen Y Q. (2005a) *Macromolecules.* 38, 2037-2039.

Tang H D, Tang J B, Ding S J, Radosz M, Shen Y Q. (2005b) *J. Polym. Sci.* 43 1432-1443.

Tang J B, Tang H D, Sun W L, Plancher H, Radosz M, Shen Y Q. (2005c) *Chem. Comm.* 3325-3327.

Tsarevsky N V, Bernaerts K V, Dufour B, Du Prez F E, Matyjaszewski K. (2004) *Macromolecules.* 37, 9308-9313.

Vygodskii YaS, Mel'nik O A, Kazakova E V, Shaplov A S, Komarova L I, Kizhnyaev V N. (2008) *Polymer Science, Ser. B.* 50 193-197.

Wasserscheid P, Keim W. (2000) *Angew Chem Int Ed.* 39, 3772-3789.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A tetrazole-containing polymer of intrinsic microporosity comprising 10 or more subunits, wherein one or more of the subunits comprise one or more tetrazolyl moieties.

2. The polymer according to claim 1 having a degree of tetrazole substitution in a range of from 0.01 to 1.

3. The polymer according to claim 1 having a degree of tetrazole substitution in a range of from 0.1 to 1.

4. The polymer according to claim 1 having a general structure encompassed by Formula I:

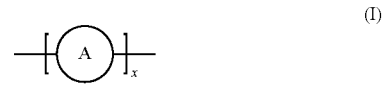

(I)

where x is an integer of 10 or greater and A represents a subunit in the polymer, wherein one or more of the subunits comprises one or more tetrazolyl moieties, and wherein A for each subunit is independently

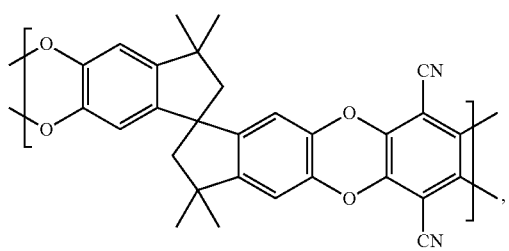
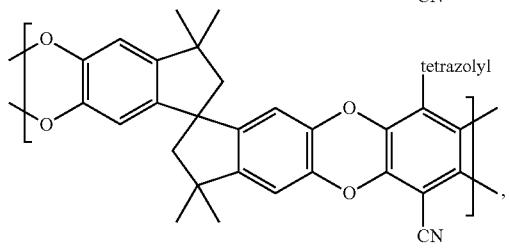
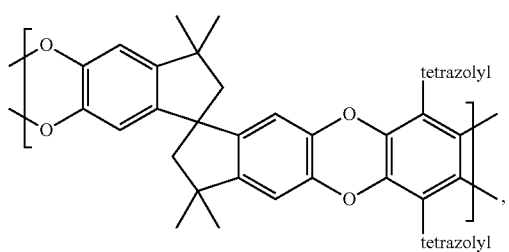
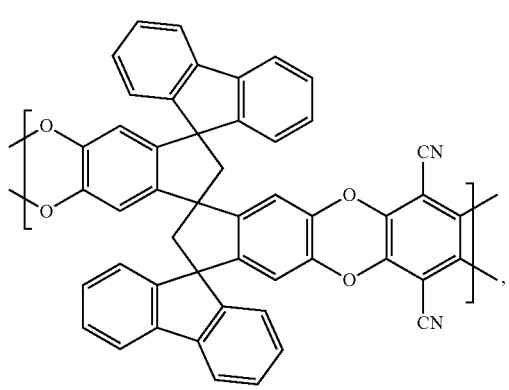
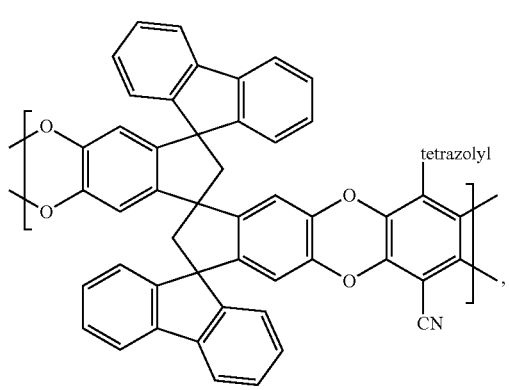
-continued
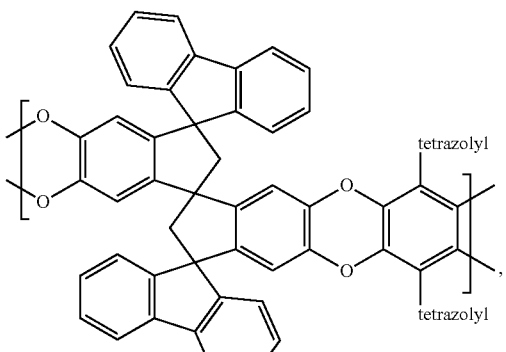
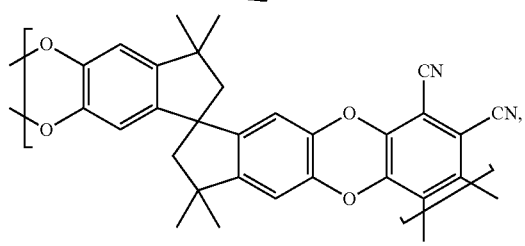
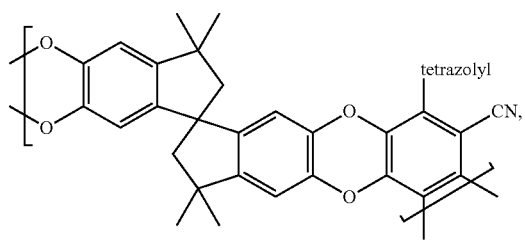
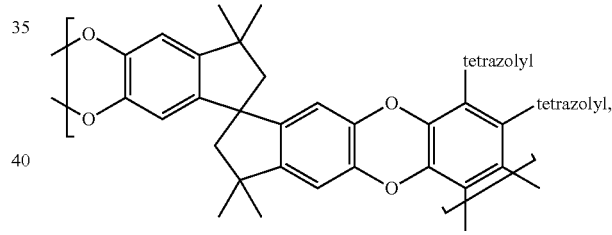
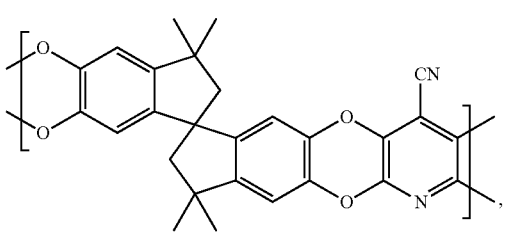
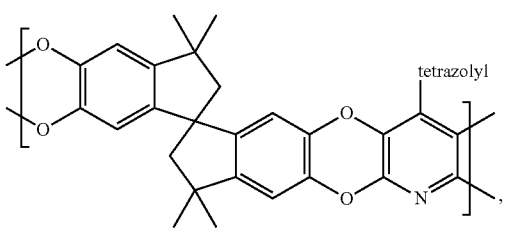

-continued
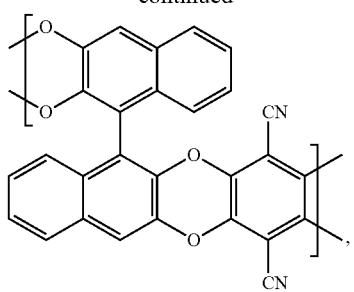
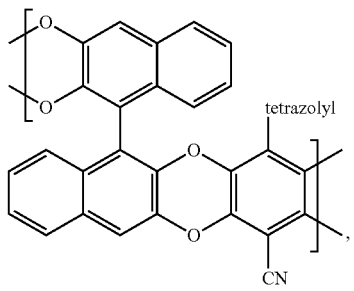
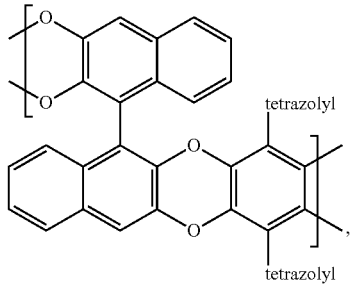
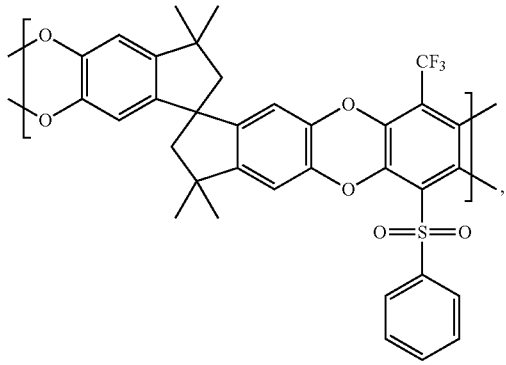
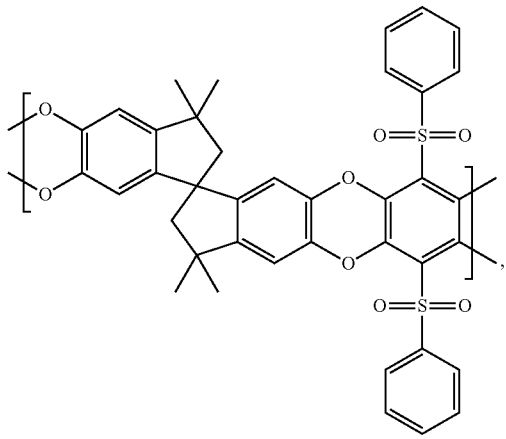
-continued
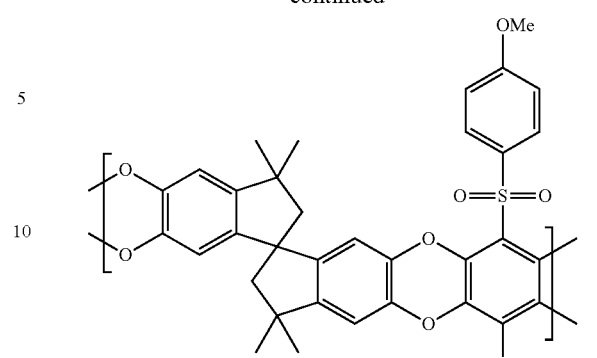
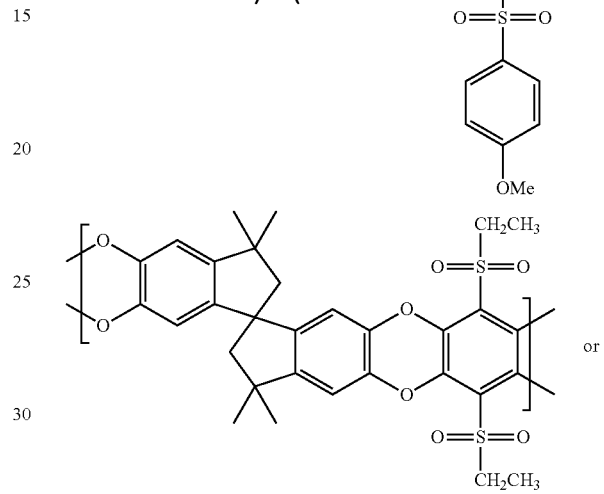
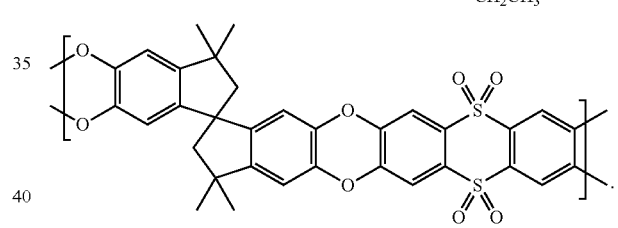
5. The polymer according to claim 4, wherein A is independently
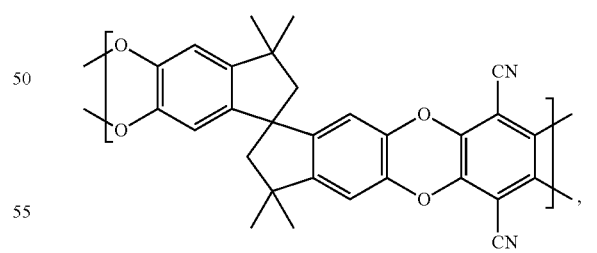
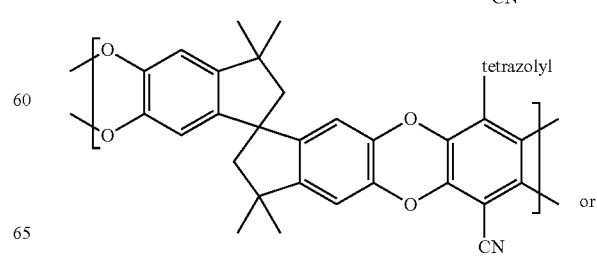

-continued

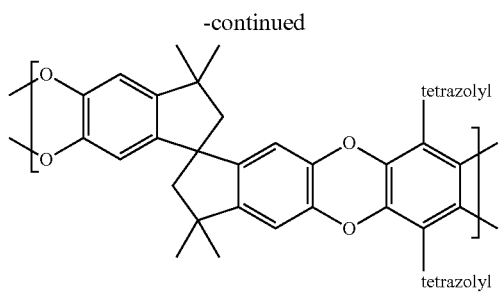
tetrazolyl
tetrazolyl provided that one or more of the subunits comprises one or more tetrazolyl moieties.

6. The polymer according to claim 4, wherein tetrazolyl is a moiety having a structure encompassed by general Formula (II) or a tautomer thereof:

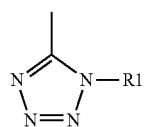
(II)

where R1 is H, alkyl, aralkyl, arylsulfonyl, alkylsulfonyl or an ionic liquid group.

7. The polymer according to claim 6, wherein R1 is H, $C_1$-$C_6$-alkyl, $C_7$-$C_{13}$-aralkyl, $C_7$-$C_{13}$-arylsulfonyl, $C_1$-$C_6$-alkylsulfonyl or $C_1$-$C_{20}$-organic amine.

8. The polymer according to claim 6, wherein R1 is H, benzyl, 4-acetamidobenezenesulfonyl, methylamine, diisopropylamine or N,N-diisopropylethylamine.

9. The polymer according to claim 4, wherein x is an integer in a range from 10 to 10,000.

10. The polymer according to claim 4, wherein x is an integer in a range from 40 to 1500.

11. The polymer according to claim 4, wherein x is an integer in a range from 40 to 1000.

12. The polymer according to claim 1 comprising 10 to 10,000 subunits.

13. The polymer according to claim 1 comprising 40 to 1000 subunits.

14. A film comprising a polymer according to claim 1.

15. The film according to claim 14 for use in gas separation, vapor separation, adsorbents or catalysis.

16. The film according to claim 14 for use in oxygen enrichment, natural gas treatment or carbon dioxide capture from emissions.

17. The film according to claim 14 for use in carbon dioxide capture from emissions.

18. Use of the polymer as defined in claim 1 as a material for membrane-based gas separation, a material for ion exchange resins, a material for chelating resins, a material for superabsorbents, a material for ion conductive matrixes, a material for catalyst supports or a material for nanoparticle stabilizers.

* * * * *